(12) United States Patent
Nakashima et al.

(10) Patent No.: US 10,862,592 B2
(45) Date of Patent: Dec. 8, 2020

(54) OPTICAL RECEIVER, OPTICAL TRANSMISSION SYSTEM, AND RECEPTION PROCESSING METHOD

(71) Applicant: FUJITSU LIMITED, Kawasaki (JP)

(72) Inventors: Hisao Nakashima, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/050,156

(22) Filed: Jul. 31, 2018

(65) Prior Publication Data
US 2019/0044619 A1 Feb. 7, 2019

(30) Foreign Application Priority Data
Aug. 2, 2017 (JP) .................................. 2017-150144

(51) Int. Cl.
*H04B 10/61* (2013.01)
*H04J 14/02* (2006.01)
*H04B 10/548* (2013.01)

(52) U.S. Cl.
CPC ......... *H04B 10/616* (2013.01); *H04B 10/548* (2013.01); *H04J 14/0298* (2013.01)

(58) Field of Classification Search
CPC . H04B 1/10; H04B 1/16; H04B 1/406; H04B 1/0475; H04B 1/1036
See application file for complete search history.

(56) References Cited

U.S. PATENT DOCUMENTS

| 5,596,436 A * | 1/1997 | Sargis ................. H04J 14/0298 398/76 |
| 5,896,211 A * | 4/1999 | Watanabe .............. H04B 10/50 398/187 |
| 7,187,723 B1 * | 3/2007 | Kawanabe ............ H04B 7/084 342/371 |
| 10,389,473 B1 * | 8/2019 | Vassilieva .......... H04B 10/0773 |
| 10,587,358 B1 * | 3/2020 | Ebrahimzad ........ H04J 14/0298 |
| 2002/0044322 A1 * | 4/2002 | Blumenthal ........ H04J 14/0298 398/147 |
| 2006/0120727 A1 * | 6/2006 | Lee ..................... H04J 14/0252 398/135 |
| 2006/0193298 A1 * | 8/2006 | Kishigami ............ H04L 5/0028 370/338 |

(Continued)

FOREIGN PATENT DOCUMENTS

| JP | H07-111486 A | 4/1995 |
| JP | 2000-332688 A | 11/2000 |

OTHER PUBLICATIONS

Meng Qui, et al., "Subcarrier Multiplexing Using DACs for Fiber Nonlinearity Mitigation in Coherent Optical Communication Systems," OFC 2014, paper Tu3J.2, 2014 (Total 3 pages).

(Continued)

*Primary Examiner* — Tanya T Motsinger
(74) *Attorney, Agent, or Firm* — Fujitsu Patent Center

(57) ABSTRACT

An optical receiver includes, a first converting circuit that converts an optical signal into an electric signal, a plurality of common circuits, each of which has a same circuit configuration and performs a digital signal processing on the electric signal, and a processor that selects and operates one or more common circuits from among the plurality of common circuits according to a transmission method.

17 Claims, 21 Drawing Sheets

(56) References Cited

U.S. PATENT DOCUMENTS

| | | | | |
|---|---|---|---|---|
| 2007/0211641 A1* | 9/2007 | Fu | ............... | H04L 27/2647 370/241 |
| 2007/0258713 A1* | 11/2007 | Jung | ............... | H04J 14/0226 398/71 |
| 2009/0196609 A1* | 8/2009 | Koyama | ............... | H04J 14/0246 398/58 |
| 2009/0324226 A1* | 12/2009 | Buchali | ............... | H04B 10/548 398/76 |
| 2011/0002689 A1* | 1/2011 | Sano | ............... | H04L 25/03159 398/44 |
| 2011/0176815 A1* | 7/2011 | Frankel | ............... | H04B 10/6161 398/184 |
| 2011/0255870 A1* | 10/2011 | Grigoryan | ............... | H04B 10/548 398/65 |
| 2012/0251121 A1* | 10/2012 | McNicol | ............... | H04J 14/06 398/91 |
| 2012/0269510 A1* | 10/2012 | Hui | ............... | H04L 27/2697 398/50 |
| 2013/0170834 A1* | 7/2013 | Cho | ............... | H04J 14/0282 398/58 |
| 2014/0147119 A1* | 5/2014 | Watanabe | ............... | H04B 10/5165 398/76 |
| 2014/0242932 A1* | 8/2014 | Gekat | ............... | H03G 3/3052 455/226.2 |
| 2015/0092759 A1* | 4/2015 | Cvijetic | ............... | H04B 7/2665 370/336 |
| 2015/0103714 A1* | 4/2015 | Lee, II | ............... | H04L 1/0027 370/311 |
| 2016/0191190 A1* | 6/2016 | Mitchell | ............... | H04J 14/0298 398/48 |
| 2016/0191191 A1* | 6/2016 | Mitchell | ............... | H04J 14/0265 398/48 |
| 2016/0337096 A1* | 11/2016 | Chari | ............... | H04L 5/0048 |
| 2017/0026114 A1* | 1/2017 | Sugitani | ............... | H04B 10/07953 |
| 2017/0041077 A1* | 2/2017 | Yu | ............... | H04B 10/614 |
| 2017/0078219 A1* | 3/2017 | Connor | ............... | H04L 47/122 |
| 2017/0163371 A1* | 6/2017 | Hino | ............... | H04J 14/02 |
| 2017/0180055 A1* | 6/2017 | Yu | ............... | H04B 10/6163 |
| 2017/0222716 A1* | 8/2017 | Nakashima | ............... | H04B 10/0795 |
| 2017/0272195 A1* | 9/2017 | Kaneda | ............... | H04J 14/06 |
| 2018/0145761 A1* | 5/2018 | Zhuge | ............... | H04B 10/616 |
| 2018/0316438 A1* | 11/2018 | Kodama | ............... | H04J 14/00 |
| 2019/0044619 A1* | 2/2019 | Nakashima | ............... | H04J 14/0298 |
| 2019/0081701 A1* | 3/2019 | Oda | ............... | H04B 10/0775 |
| 2019/0199443 A1* | 6/2019 | Zamani | ............... | H04B 10/614 |
| 2019/0280910 A1* | 9/2019 | Sun | ............... | H04J 14/06 |
| 2019/0326987 A1* | 10/2019 | Noguchi | ............... | H04J 14/0298 |
| 2019/0349224 A1* | 11/2019 | Chiskis | ............... | H04B 3/32 |
| 2020/0052794 A1* | 2/2020 | Noguchi | ............... | H04J 14/0224 |

OTHER PUBLICATIONS

Hisao Nakashima, et al., "Experimental Investigation on Nonlinear Tolerance of Subcarrier Multiplexed Signals with Spectrum Optimization," Ecoc 2015, paper Mo.3.6.4, 2015 (Total 3 pages).

* cited by examiner

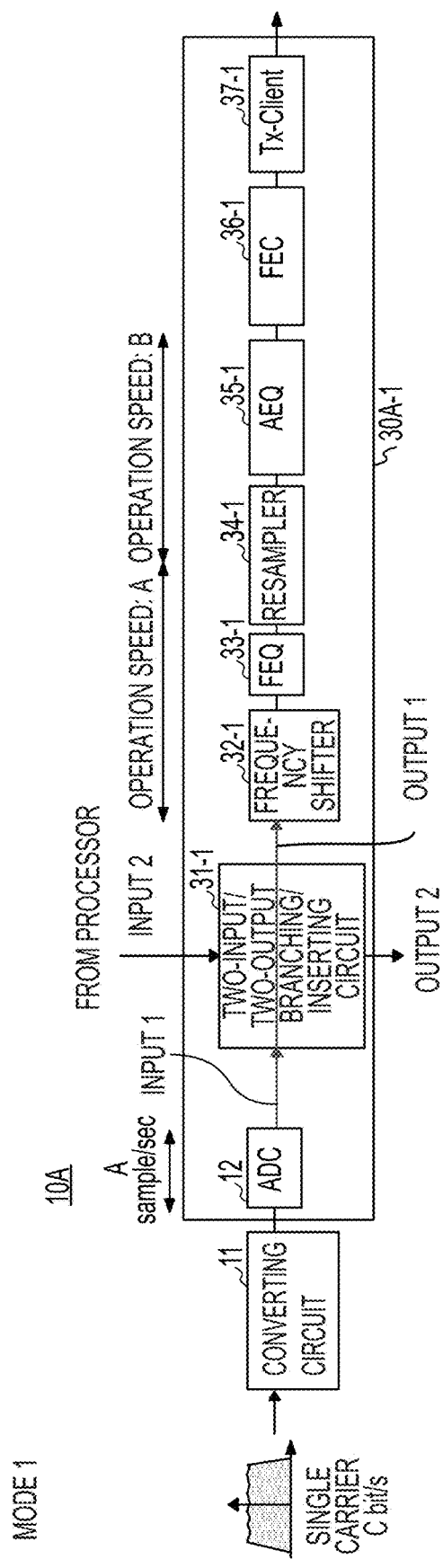

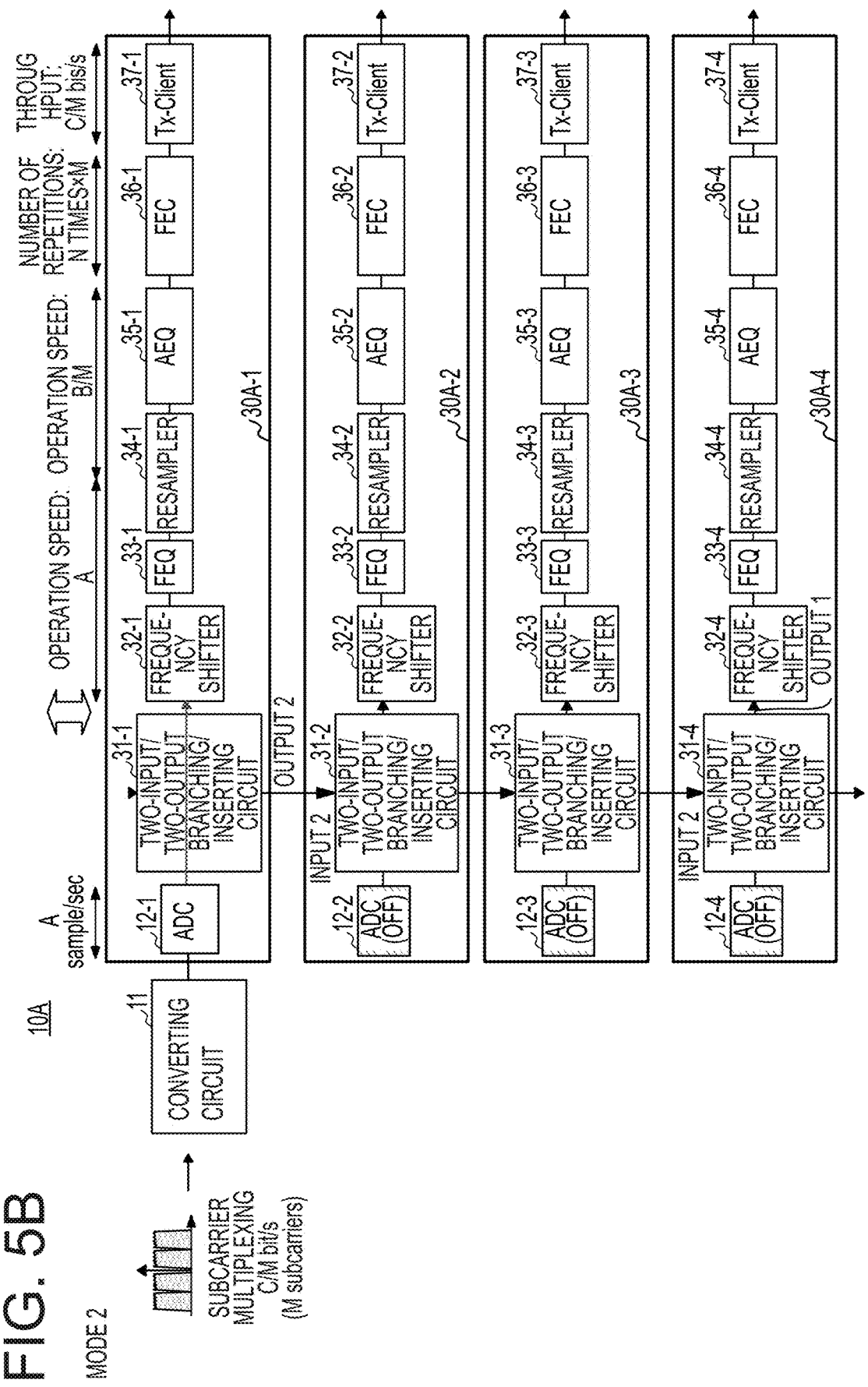

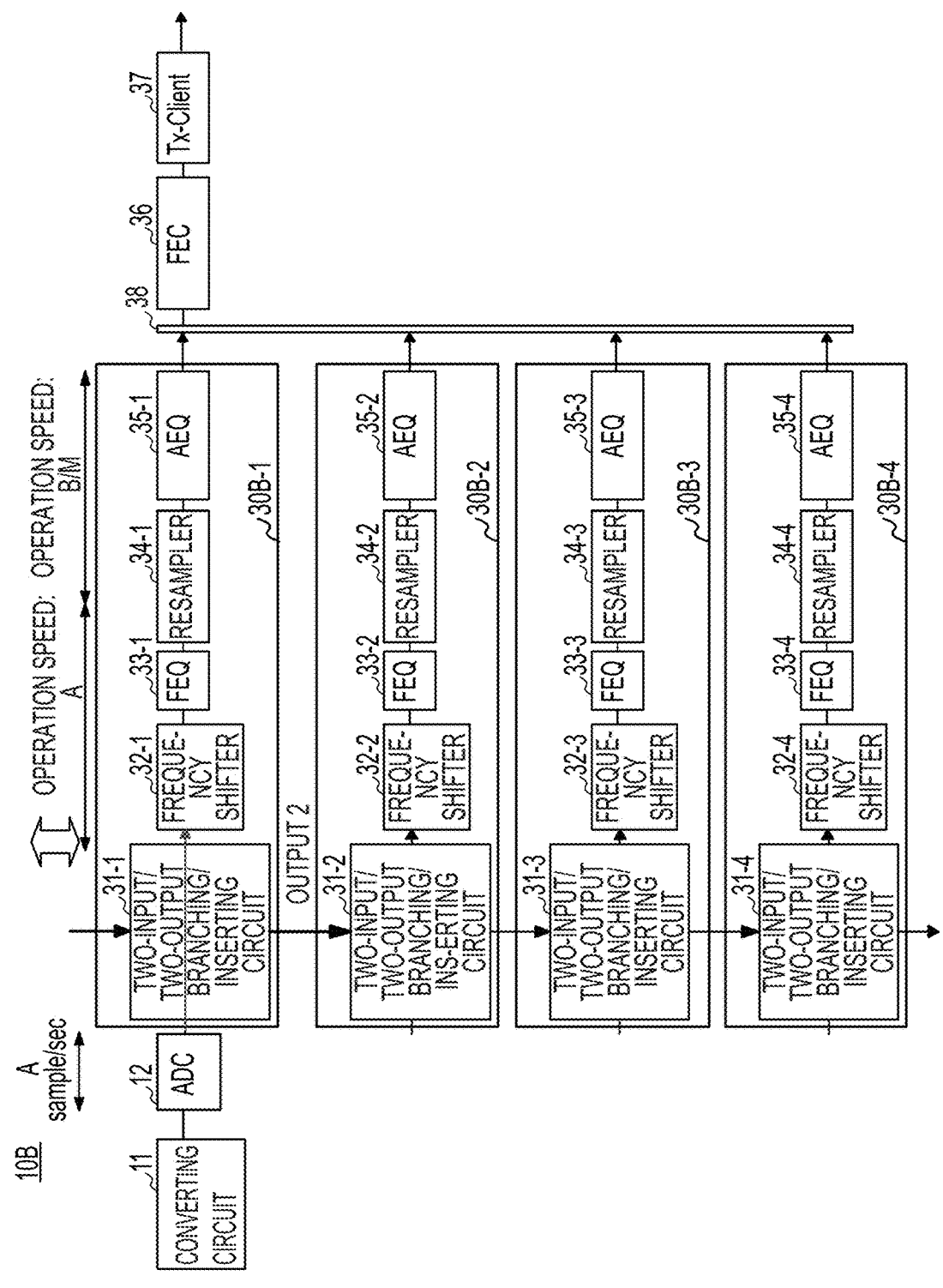

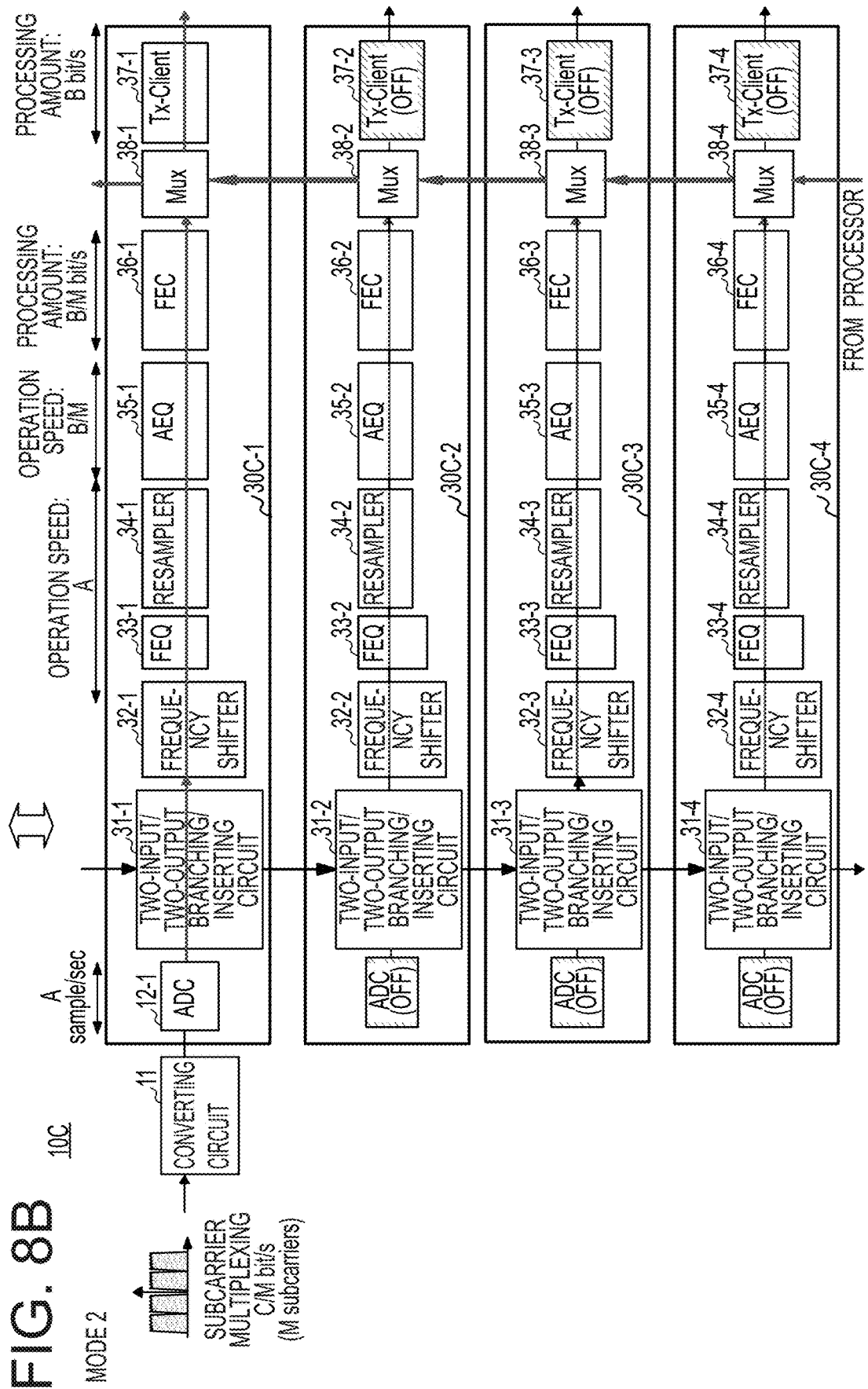

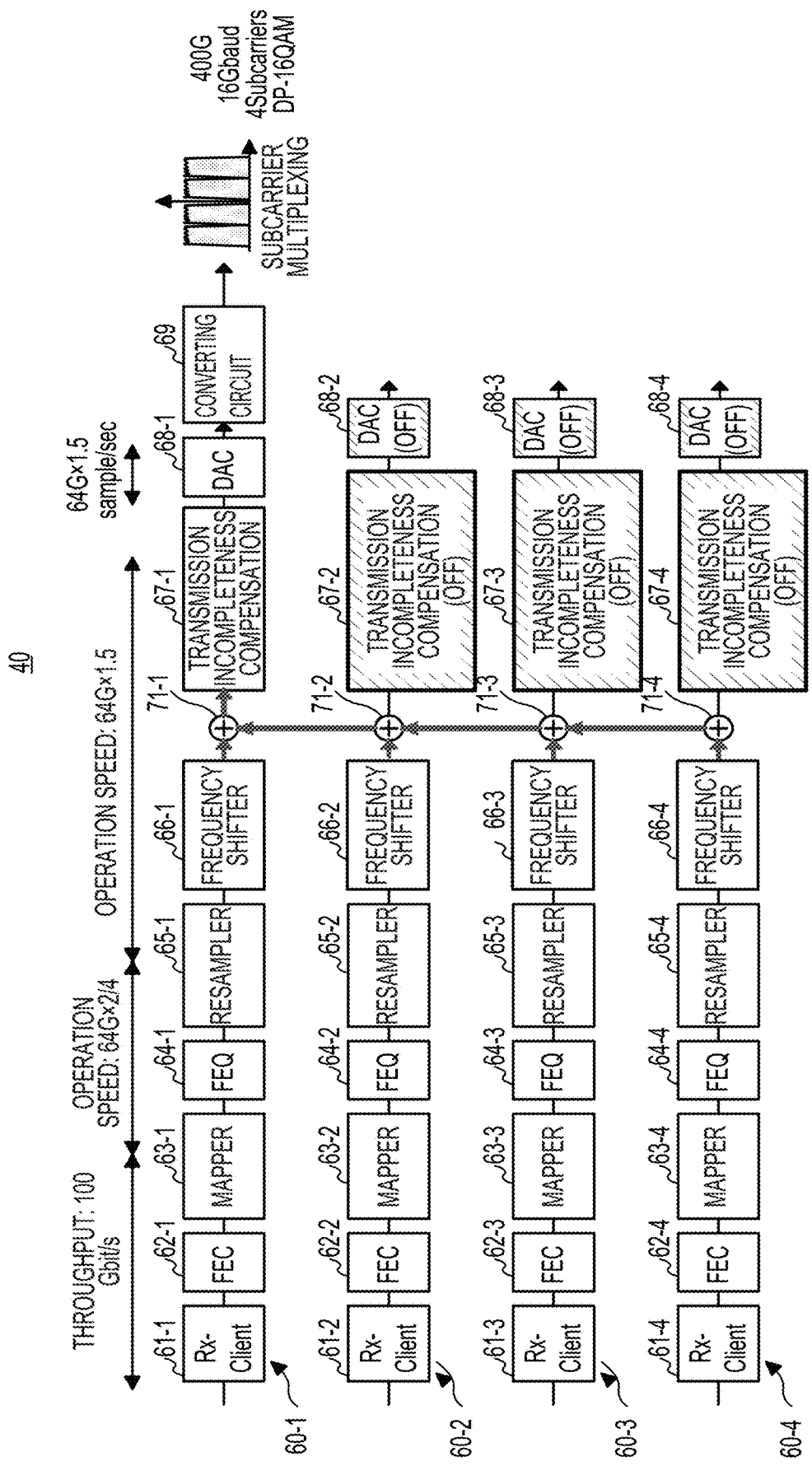

FOR DIC

FOR METRO

FOR LH

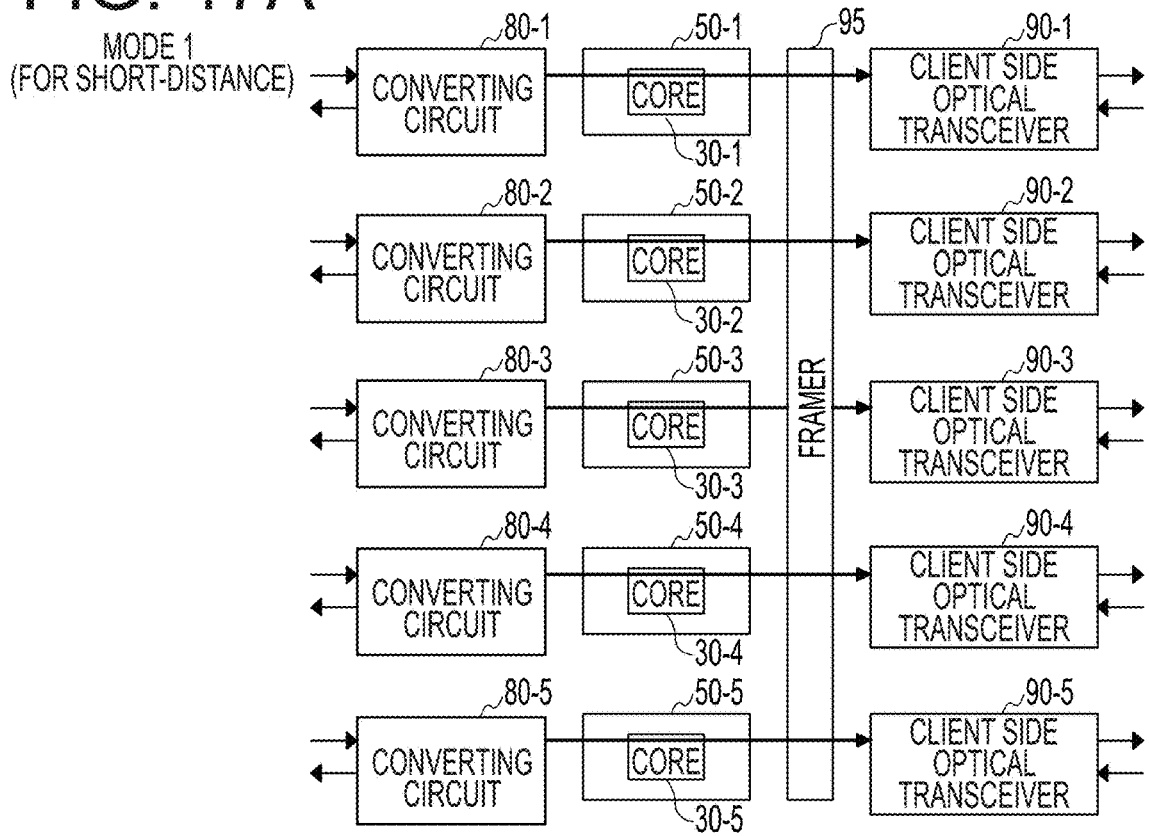
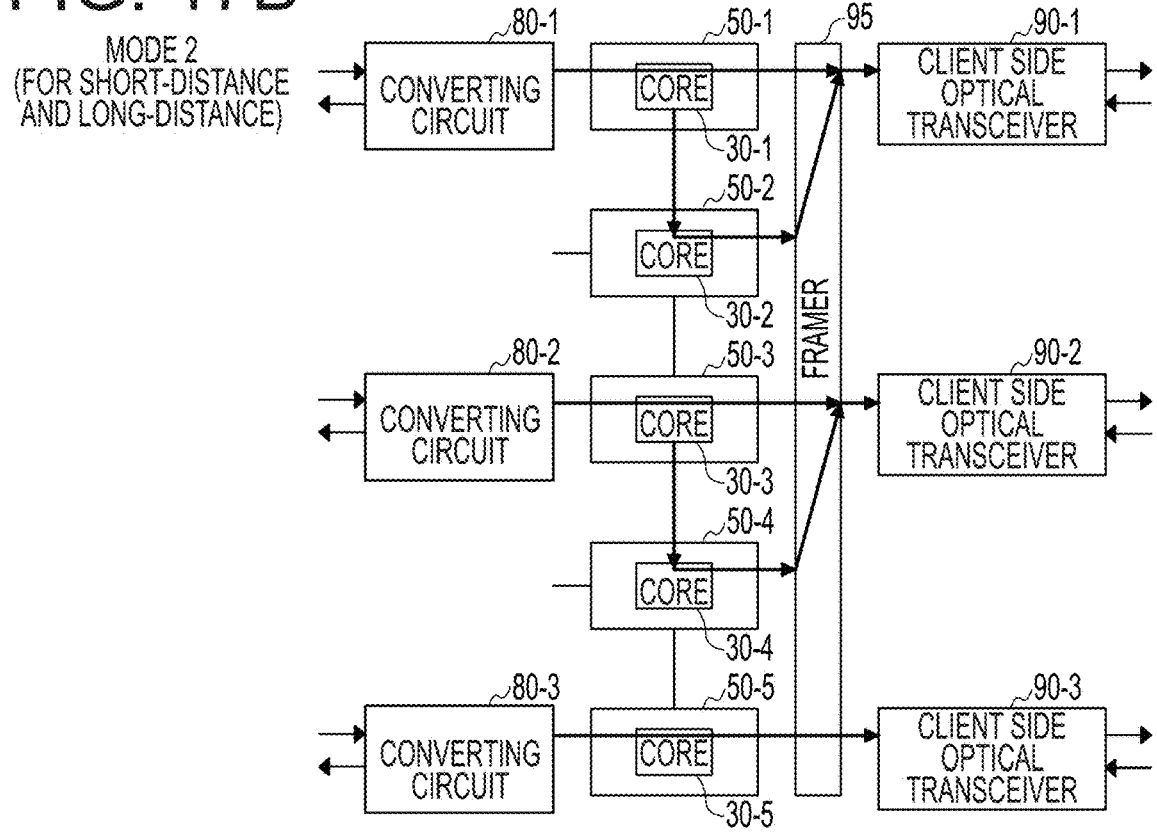

MODE 1
(FOR SHORT-DISTANCE)

MODE 2
(FOR SHORT-DISTANCE
AND LONG-DISTANCE)

OPTICAL RECEIVER, OPTICAL TRANSMISSION SYSTEM, AND RECEPTION PROCESSING METHOD

CROSS-REFERENCE TO RELATED APPLICATION

This application is based upon and claims the benefit of priority of the prior Japanese Patent Application No. 2017-150144, filed on Aug. 2, 2017, the entire contents of which are incorporated herein by reference.

FIELD

The embodiments discussed herein are related to an optical receiver, an optical transmission system, and a reception processing method.

BACKGROUND

A digital coherent reception technology that combines a coherent reception technology and a digital signal processing technology has already been put into practical use in order to implement a long-distance and large-capacity optical transmission. With the recent advances in a data center technology and a cluster technology, it has been required to further increase the capacity of the optical transmission system with short distances of tens of kilometers to hundreds of kilometers, and an application of the digital coherent reception technology to this field is expected. However, in the short-distance transmission system, a demand for power consumption is more stringent, and the power of a digital signal processing circuit is required to be lower than that of the long-distance transmission. In the digital signal processing on a receiving side, a dispersion compensation circuit and an adaptive equalization circuit that compensate for the waveform distortion of a transmission path have a large scale and consume a large amount of power. The circuit scale for a dispersion compensation and an adaptive equalization depends on a transmission distance.

In the meantime, a subcarrier multiplexing optical transmission method has attracted attention which performs an optical modulation with signals obtained by frequency-multiplexing a plurality of subcarrier signals having low symbol rates. In the subcarrier multiplexing method, since the symbol rate is low, the method is resistant to the waveform distortion such as a chromatic dispersion and a polarization mode dispersion of the transmission path, and the transmission distance may be extended more than a single carrier transmission with the same signal quality (see, e.g., Non-Patent Document 1). Further, by optimizing the symbol rate with the subcarrier multiplexing modulation method, it is possible to improve the waveform distortion tolerance due to the nonlinear optical effect of an optical fiber (see, e.g., Non-Patent Document 2).

Related technologies are disclosed in, for example, Meng Qiu, et al., "Subcarrier Multiplexing Using DACs for Fiber Nonlinearity Mitigation in Coherent Optical Communication Systems," OFC 2014, paper Tu3J. 2, 2014 (Non-Patent Document 1) and Hisao Nakashima, et al., "Experimental Investigation on Nonlinear Tolerance of Subcarrier Multiplexed Signals with Spectrum Optimization," ECO2015, paper Mo. 3. 6. 4, 2015 (Non-Patent Document 2).

SUMMARY

According to an aspect of the embodiments, an optical receiver includes, a first converting circuit that converts an optical signal into an electric signal, a plurality of common circuits, each of which has a same circuit configuration and performs a digital signal processing on the electric signal, and a processor that selects and operates one or more common circuits from among the plurality of common circuits according to a transmission method.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 5A and 5B are diagrams illustrating the configuration and operation of an optical receiver according to a first embodiment;

FIGS. 7A and 7B are diagrams illustrating the configuration and operation of an optical receiver according to a second embodiment;

FIGS. 8A and 8B are diagrams illustrating the configuration and operation of an optical receiver according to a third embodiment;

FIG. 15 is a diagram illustrating an operation when an optical transmitter transmits a subcarrier multiplexing signal;

FIGS. 17A and 17B are diagrams illustrating a system configuration example according to the first embodiment.

DESCRIPTION OF EMBODIMENTS

In a subcarrier multiplexing modulation method, a signal processing circuit configured to compensate for a waveform distortion may be reduced, and the increase in the circuit scale may be suppressed even in a long-distance optical transmission. In the meantime, a subcarrier separation causes a crosstalk between subcarriers. When the spacing between the subcarriers is widened to reduce the crosstalk, the frequency utilization efficiency decreases. Efficient optical transmission may be implemented over a wide range from a short distance to a long distance by switching between a single carrier transmission method and a subcarrier multiplexing transmission method according to propagation conditions.

It is possible to switch between the single carrier method and the subcarrier multiplexing method according to transmission conditions in order to efficiently cover the long-distance optical transmission system of thousands of kilometers from the short-distance optical communication system of less than 100 km. For example, in an optical transmission system with a short transmission distance, the transmission is carried out by the single carrier method. In a system with a long transmission distance, the transmission is carried out by the subcarrier multiplexing method, which is resistant to the waveform distortion and the nonlinearity of the transmission path. By using the single carrier method for the short-distance optical transmission and using the subcarrier multiplexing method for the long-distance transmission, it is possible to suppress the increase in the scale of the waveform distortion compensation in both cases.

However, the single carrier method and the subcarrier multiplexing method are different from each other in the configuration of an equalization circuit configured to compensate for the waveform distortion of the transmission path. Two different signal processing circuits are needed to simply enable a switching between the two methods.

Figure 1:
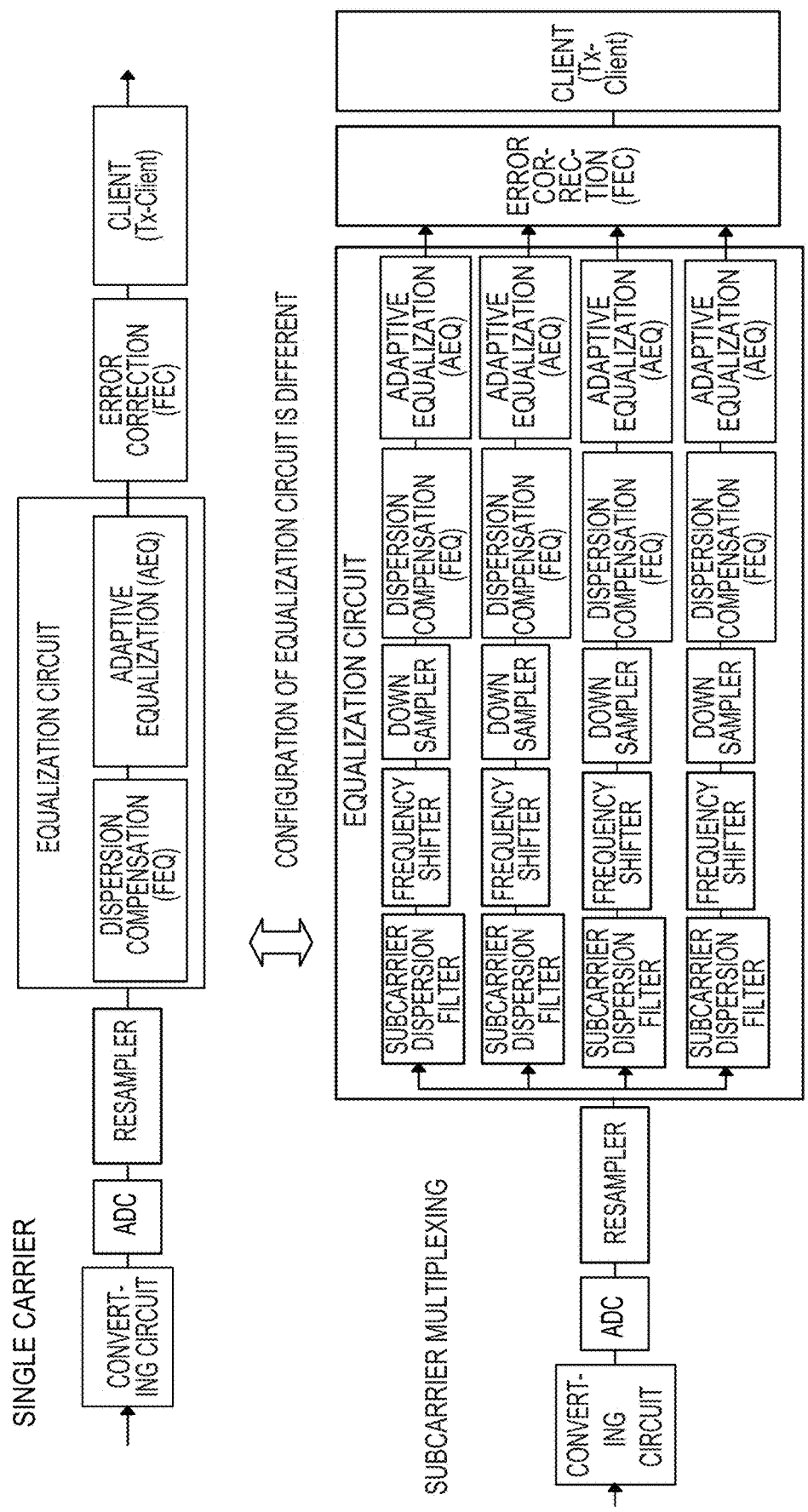
FIG. 1 is a diagram for explaining a problem when switching between a single carrier transmission method and a subcarrier multiplexing transmission method.

As illustrated in FIG. 1, on a receiving side, the signal received by an optical receiving (indicated as "Rx" in the figure) front end circuit is converted into an electric signal and digitized by an analog-digital converter (ADC), and a resampler arranges a sampling rate in an integer multiple of a data rate and inputs the arranged sampling rate to the equalization circuit as required. Up to this point, the single carrier method and the subcarrier multiplexing method are the same.

In the single carrier method, the digitally-sampled signal is equalized with a fixed dispersion compensation amount by a fixed equalizer (FEQ), and is subjected to the waveform distortion compensation that adaptively and dynamically changes in an adaptive equalizer (AEQ) (e.g., a polarization fluctuation, a polarization mode dispersion, a laser phase noise, or the like). Thereafter, the digitally-sampled signal is subjected to a forward error correction (FEC) and is transmitted as a client signal from a client side transmission interface (indicated as "Tx-Client" in the figure) to other networks, routers, switches, computers, or the like.

In the subcarrier multiplexing method, the digitally-sampled signal is separated for each subcarrier by a subcarrier separation filter, and receives a frequency shift to be converted into a low sampling frequency (symbol rate per subcarrier) in a down sampler. Thereafter, the digitally-sampled signal receives a dispersion compensation (or a fixed equalization) and an adaptive equalization for each subcarrier, and is transmitted as a client signal from the client side transmission interface (Tx-Client) to other networks, routers, switches, computers, or the like after undergoing an error correction.

In this way, the single carrier method and the subcarrier multiplexing method are different from each other in the configuration of the equalization circuit. When separate digital processing circuits are easily used for each transmission method, the circuit scale becomes larger and power consumption increases.

Therefore, in the present embodiment, a plurality of common circuits that may be used both in the single carrier method and in the subcarrier multiplexing method are disposed to support both transmission modes. The common circuits are not necessarily formed on the same chip, but may be formed on different chips. Since the plurality of common circuits are only arranged using the same circuit (common circuit) for the single carrier transmission and the subcarrier multiplexing transmission, the circuit design is simplified.

Figure 2:
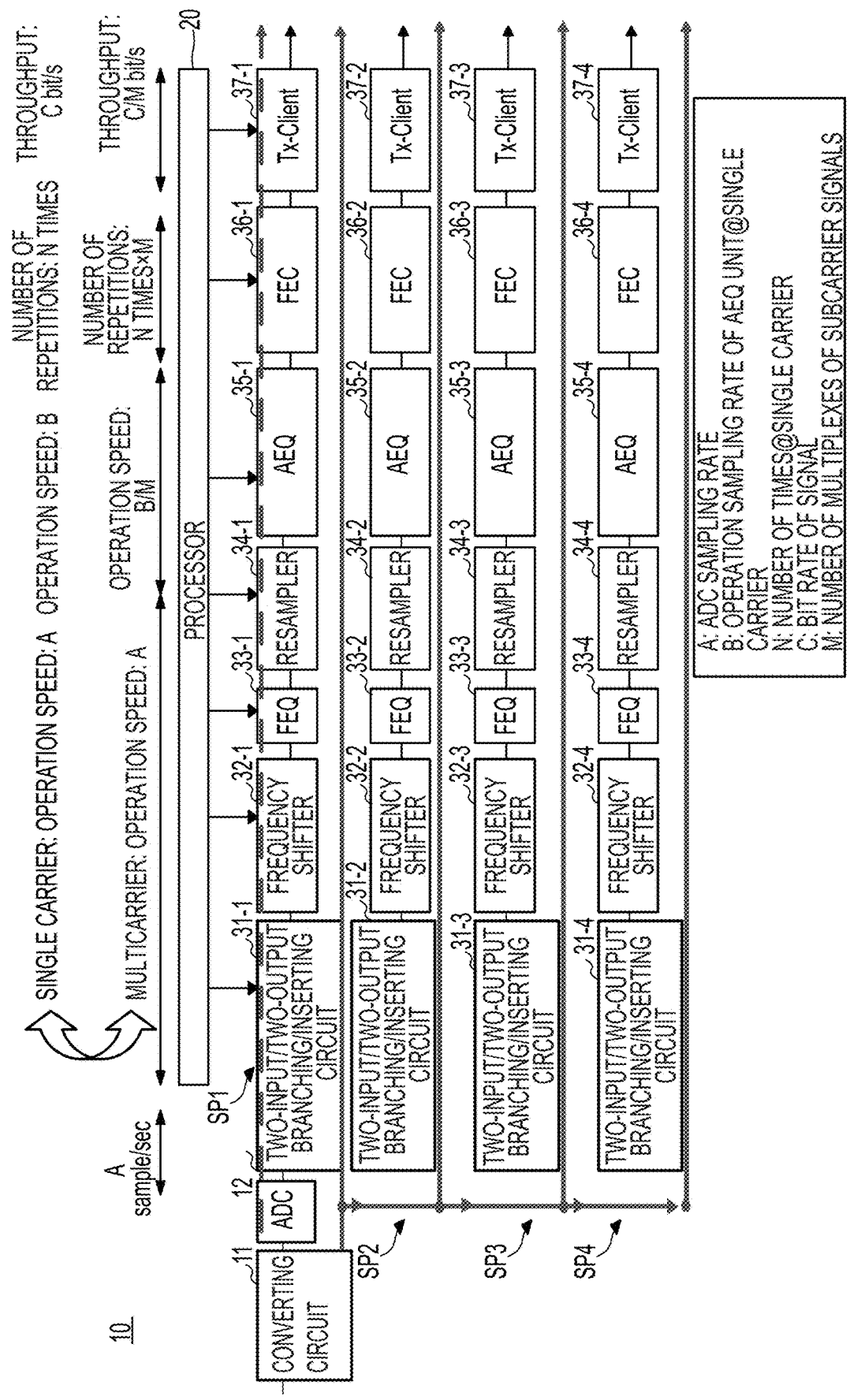
FIG. 2 is a diagram for explaining the basic concept of an optical transmission according to an embodiment.

FIG. 2 is a diagram for explaining the basic concept of an embodiment. A receiver 10 includes a plurality of signal processing sequences SP1 to SP4 having the same configuration. Each signal processing sequence includes a two-input/two-output branching/inserting circuit 31, a frequency shifter 32, an FEQ 33, a resampler 34, an AEQ 35, an FEC 36, and a client side transmission interface 37 as a common configuration. In the figure, these processing blocks are also indicated together with the branch numbers of the corresponding signal processing sequences. Each signal processing sequence may be referred to as a "common circuit" or a "signal processing core."

In the example of FIG. 2, four signal processing sequences SP1 to SP4 are used for processing after an ADC 12, but the number of the signal processing sequences SP is not limited to four. Also, as described later, the ADC 12 may be included in each of the signal processing sequences SP1 to SP4, or the processing after the FEC 36 may be collectively performed. The switching between the single carrier processing and the multicarrier processing, and the operations of the processing blocks included in the respective signal processing sequences SP are controlled by a processor 20.

At the time of the single carrier processing, one signal processing sequence, for example, SP1, is used. In the multicarrier processing, at least another signal processing sequence is used in addition to the signal processing sequence SP1. One of the features of the embodiment is to switch between the single carrier processing and the multicarrier processing based on the control from the processor 20 using the two-input/two-output branching/inserting circuit 31. Whether the transmitted signal is a single carrier signal or a multicarrier signal is determined by a user or a network control device, and an optical receiver 10 is notified from a network or a transmission system.

At the time of the single carrier processing, the received signal is converted into an electric signal by an optical receiving front end circuit (a converting circuit) 11, digitized by the ADC 12, and input to a two-input/two-output branching/inserting circuit 31-1 of the signal processing sequence SP1. The two-input/two-output branching/inserting circuit 31-1 outputs the digitally-sampled signal to a frequency shifter 32-1 by the control from the processor 20. That is, only one of two outputs is used, and the other output is turned off. The frequency of the received signal is matched with the transmission frequency in the frequency shifter 32-1 and is output as a client signal from a client side transmission interface 37-1 after undergoing a dispersion compensation by an FEQ 33-1, resampling by a resampler 34-1, an adaptive equalization by an AEQ 35-1, and an error correction by an FEC 36-1.

At the time of the multicarrier processing, by the control of the processor 20, the two-input/two-output branching/inserting circuit 31-1 outputs an input from the ADC 12 to the frequency shifter 32-1 and simultaneously outputs the input from the ADC 12 to the adjacent signal processing sequence SP2 as well. The processor 20 controls the input/output operation of the two-input/two-output branching/inserting circuit 31 of each signal processing sequence SP in accordance with the number of multiplexed subcarriers. For example, when all of the signal processing sequences SP1 to SP4 is used, the two-input/two-output branching/inserting circuits 31-1 to 31-3 of the signal processing sequences SP1 to SP3 turn on the two outputs. A two-input/two-output branching/inserting circuit 31-4 of the signal processing sequence SP4 turns on only the output to a frequency shifter 32-4.

In each of the signal processing sequences SP1 to SP4, the corresponding subcarrier component is selected according to the frequency shifter 32 and the FEQ 33. The FEQ 33 performs a dispersion compensation as well as a carrier separation. Each subcarrier component is subjected to a polarization separation, a polarization mode dispersion compensation, and an adaptive equalization such as a carrier frequency and phase synchronization in the AEQ 35.

This configuration facilitates designing the circuit because a plurality of circuits which are the same as those used in the single carrier processing may be arranged to cope with the multicarrier signal processing. In addition, the interface may be simplified by connecting the input/output to the adjacent signal processing sequence by the two-input/two-output branching/inserting circuit 31.

When it is assumed that the sampling rate of the ADC 12 is A (number of samples/second), the operation speed from the two-input/two-output branching/inserting circuit 31 to the input of the resampler 34 is A during the single carrier processing. The resampler 34 performs resampling at a speed suitable for the processing speed of the AEQ 35, and the operation speed becomes the sampling rate B of the AEQ 35 (number of samples/second). The number of repetitions of the FEC 36 is N times, and the throughput of the client side transmission interface 37 is C bps.

When it is assumed that the number of multiplexed subcarriers is M in the multicarrier processing, the operation speed of each of the signal processing sequences SP1 to SP4 to the input of the resampler 34 is A, the operation speed of the AEQ 35 is B/M, the number of repetitions of the FEC 36 is N×M times, and the throughput of the client side transmission interface 37 is C/M bps. Since it is possible to increase the number of repetitions of the FEC as the processing amount decreases per one signal processing sequence, the accuracy of the error correction may be improved.

The processor 20 switches the processing speeds of the resampler 34, the AEQ 35, and the client side transmission interface 37 of the signal processing sequence used, and the number of repetitions of the FEC 36, according to the number of multiplexed subcarriers. As a result, it is possible to suppress the increase in power consumption and improve the FEC performance even in the multicarrier processing using a plurality of signal processing sequences. It is possible to increase the number of repetitions with the same processing amount because the signal speed input to the FEC circuit decreases according to the number of subcarriers. However, it is also possible to reduce the power by making the number of repetitions the same.

In addition, the computation amount may be reduced by allowing the resampler 34 to perform a resampling of converting the sampling rate and a down sampling of selecting the subcarrier components in common.

Figure 3:
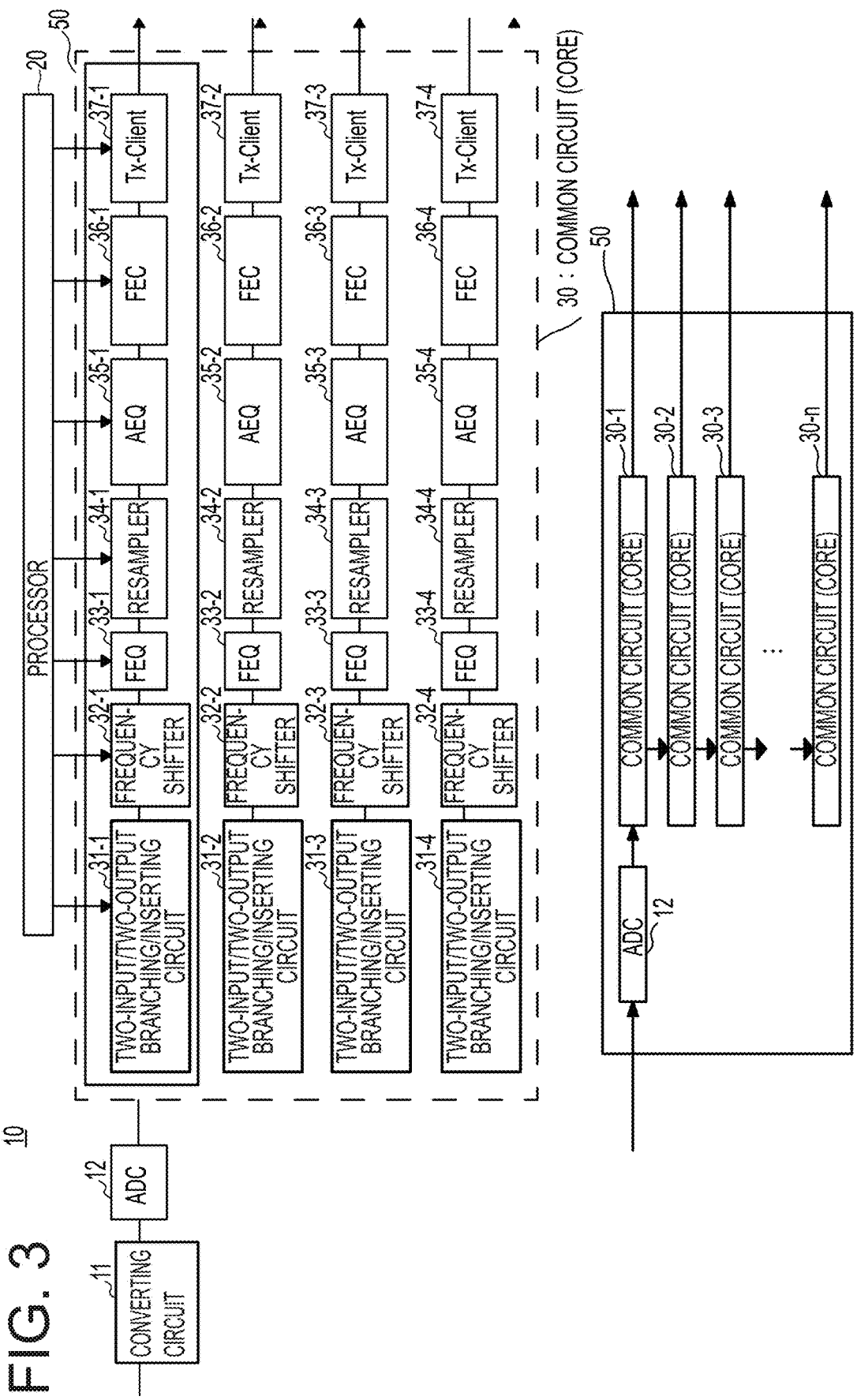
FIG. 3 is a diagram illustrating an example of arrangement of a plurality of common circuits (signal processing cores)

FIG. 3 illustrates an example of arrangement of a plurality of common circuits (signal processing cores). The ADC 12 and a plurality of common circuits 30-1 to 30-n (collectively referred to as "common circuit 30" as appropriate) are arranged in one chip 50. Since the common circuits 30-1 to 30-n have the same circuit configuration, the circuit design is simple and easy.

In the upper section of FIG. 3, four signal processing cores are depicted in accordance with the configuration of FIG. 2, but the number of the common circuits 30 is not limited to four. The output of the ADC 12 is connected to the input of the common circuit 30-1. The common circuit 30-1 is used both in the single carrier processing and in the multicarrier processing, and the connection of the input/output between the adjacent common circuits 30 is adjusted by the two-input/two-output branching/inserting circuit 31. The optical receiving front end circuit 11 and the chip 50 may be mounted on, for example, the same interposer substrate.

Figure 4:
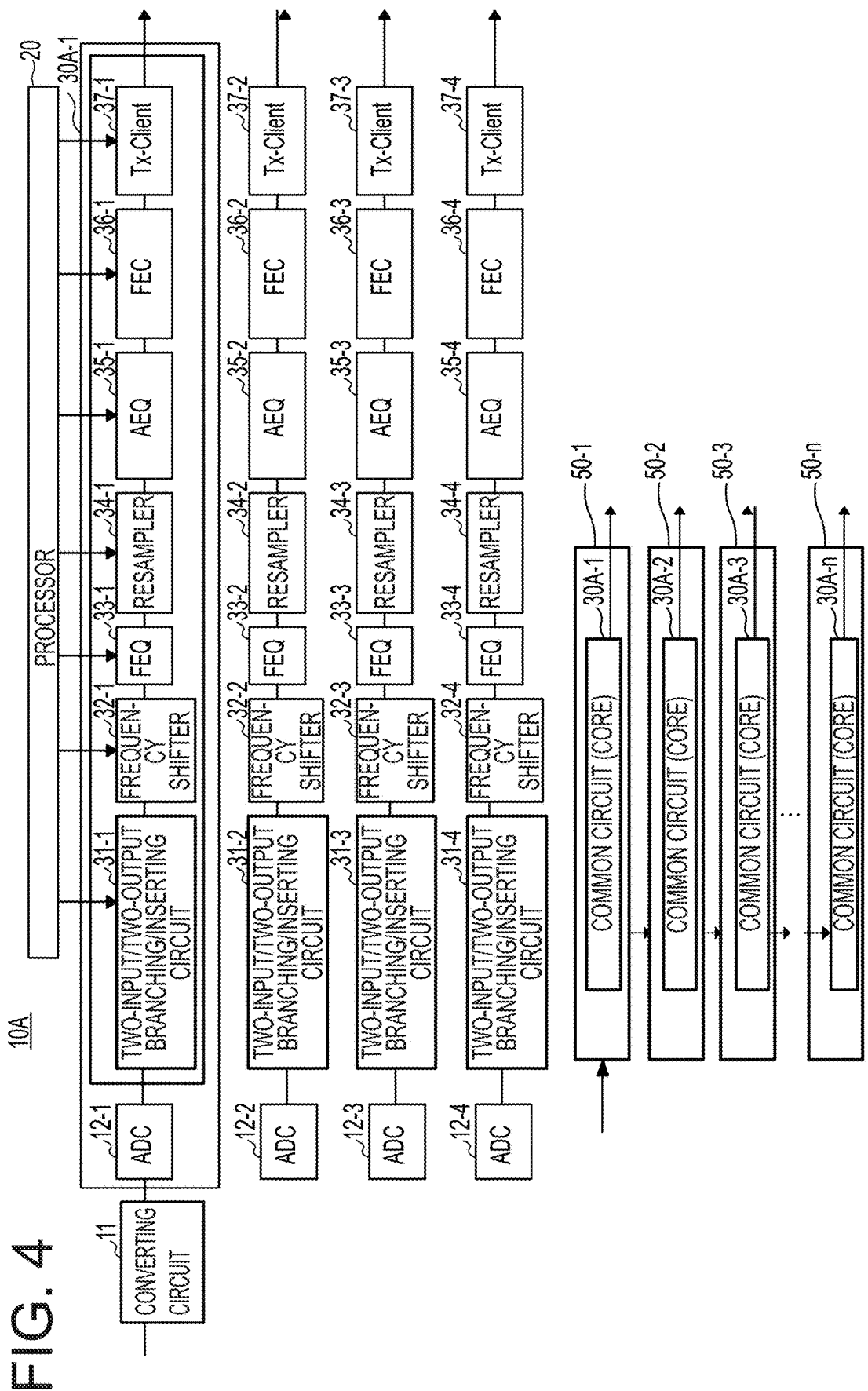
FIG. 4 is a diagram illustrating another arrangement example of a plurality of common circuits (signal processing cores)

FIG. 4 illustrates another arrangement example of a plurality of common circuits (signal processing cores). In FIG. 4, one common circuit 30A is arranged in one chip 50, and a plurality of chips 50-1 to 50-n are arranged. The common circuits 30A-1 to 30A-n in FIG. 4 each includes ADCs 12-1 to 12-n. In the configuration illustrated in FIG. 4, since a plurality of the same circuits are only arranged, the circuit design is simple and easy. Only one of the plurality of chips 50-1 to 50-n, that is, only the chip 50-1 connected to the optical receiving front end circuit 11, is used for the single carrier processing.

At the time of the multicarrier processing, the number of chips 50 according to the number of subcarriers is used. As described later, only the ADC 12-1 of the common circuit 30-1 connected to the optical receiving front end circuit 11 is used and the ADCs 12-2 to 12-n of the other common circuits 30-2 to 30-n are also turned off at the time of the multicarrier processing. Thus, the same switching process as in FIG. 2 is implemented.

First Embodiment

FIGS. 5A and 5B illustrate the configuration and operation of an optical receiver 10A according to a first embodiment. In the first embodiment, a plurality of common circuits 30A illustrated in FIG. 4 are arranged, and mode 1 in which the single carrier processing is performed and mode 2 in which the multicarrier processing is performed in response to the subcarrier multiplexing method are switched. Mode 1 is used, for example, for a short-distance optical communication and mode 2 is used for a long-distance optical communication.

The signal transmission rate of mode 1 is, for example, C bits/sec. The signal converted into an electric signal by the optical receiving front end circuit 11 is digitally sampled by the ADC 12-1 of the common circuit 30A-1. The output of the ADC 12-1 is connected to input 1 of the two-input/two-output branching/inserting circuit 31-1. Input 2 of the two-input/two-output branching/inserting circuit 31-1 is in the OFF state.

In mode 1, output 1 of the two-input/two-output branching/inserting circuit 31-1 is connected to the input of the frequency shifter 32-1 and output 2 is turned off. A first subcarrier component of the signal input to the frequency shifter 32-1 is taken out by the frequency shifter 32-1, the FEQ 33-1, and the resampler 34-1. The first subcarrier component is output from the client side transmission interface 37-1 after receiving an adaptive equalization processing and an error correction processing by the AEQ 35-1 and the FEC 36-1.

In mode 2, when M subcarriers are multiplexed, the transmission rate of each subcarrier is C/M bits/sec. The signal converted into an electric signal by the optical receiving front end circuit 11 is digitally sampled by the ADC 12-1 of the common circuit 30A-1. The ADCs 12-2 to 12-4 of the other common circuits 30A-2 to 30A-4 are in the OFF state. The output of the ADC 12-1 is connected to input 1 of the two-input/two-output branching/inserting circuit 31-1. The input 2 of the two-input/two-output branching/inserting circuit 31-1 is in the OFF state.

In mode 2, the output 1 of the two-input/two-output branching/inserting circuit 31-1 is connected to the input of the frequency shifter 32-1, and the output 2 is connected to the input 2 of the two-input/two-output branching/inserting circuit 31-2 of the adjacent common circuit 30A-2. The input 1 of the two-input/two-output branching/inserting circuit 31-2 is in the OFF state. The output 1 of the two-input/two-output branching/inserting circuit 31-2 is connected to the input 1 of the frequency shifter 32-2. A second subcarrier component of the signal input to the frequency shifter 32-1 is taken out by the frequency shifter 32-2, the FEQ 33-2, and the resampler 34-2. The second subcarrier component is output from the client side transmission interface 37-2 after receiving an adaptive equalization processing and an error correction processing by the AEQ 35-2 and the FEC 36-2.

The output 2 of the two-input/two-output branching/inserting circuit 31-2 is connected to the input 2 of the two-input/two-output branching/inserting circuit 31-2 of the adjacent common circuit 30A-2. Similarly, a processing for each subcarrier is performed in the common circuits 30A-1 to 30A-n in response to the number of multiplexed subcarriers. In the example of FIGS. 5A and 5B, the common circuit 30A-4 is in the final stage, and the input 2 and the output 1 of the two-input/two-output branching/inserting circuit 31-4 are in the ON state.

In the configuration of the first embodiment, it is possible to suppress the increase in the power consumption of the optical receiver 10A by switching the single carrier processing and the multicarrier processing with a simplified circuit design. In addition, it is possible to increase the number of repetitions in the FECs 36-1 to 36-4, thereby improving the transmission performance. Further, when the number of repetitions is made the same, it is possible to reduce the power consumption of the FECs 36-1 to 36-4.

Figure 6:
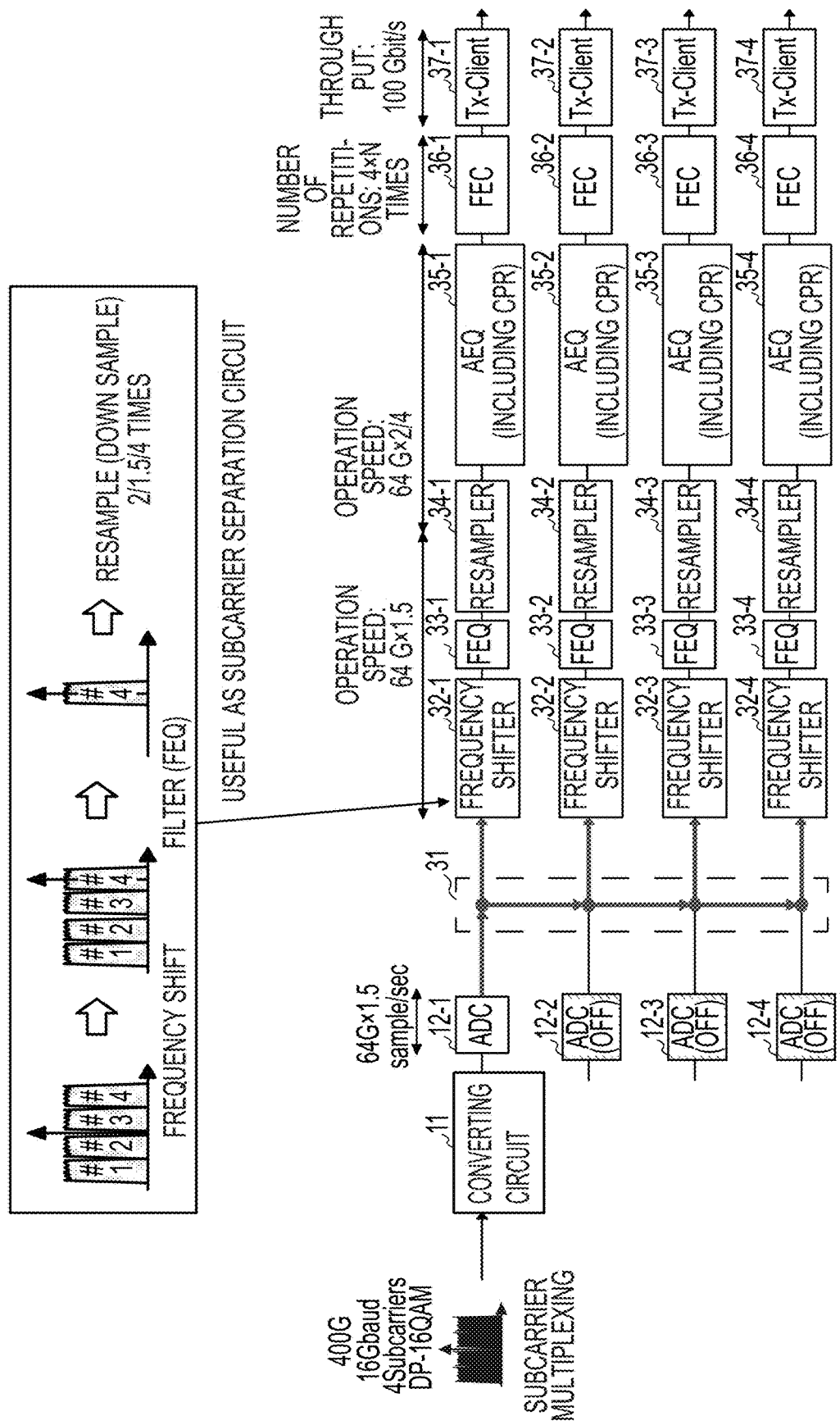
FIG. 6 is a diagram illustrating a processing operation of a subcarrier multiplexing signal according to the first embodiment.

FIG. 6 is a diagram illustrating a processing operation of a subcarrier multiplexing signal illustrated in FIGS. 5A and 5B. For example, it is assumed that a transmission rate is 400 Gbps, a modulation rate is 16 Gbaud, and four subcarriers are transmitted in a DP-16 QAM (polarization multiplexing 16 QAM) modulation method.

The received signal is converted into an analog electric signal by the optical receiving front end circuit 11 and is digitally sampled by the ADC 12-1, for example, at a sampling rate of 64 G×1.5.

The two-input/two-output branching/inserting circuit 31 distributes the output of the ADC 12-1 of the first signal processing core to other signal processing cores. Each signal processing core has a function of inputting/outputting data at the digitally sampled output of the ADC. The output of the ADC 12-1 may be configured to have a function of compensating for the incompleteness of an optical receiving circuit caused by noise or bandwidth deterioration of the optical receiving front end circuit 11.

The frequency shifter 32 shifts a center frequency of the carrier wave to the center of a transmission frequency of the target subcarrier so as to select the frequency. The FEQ 33 transmits the selected frequency component to block the remainder. For example, the frequency shifter 32-4 of a fourth signal processing core shifts the carrier wave frequency to the center frequency of subcarrier #4. The FEQ 33-4 selects the subcarrier #4 signal by passing through a signal of a predetermined bandwidth including the center frequency. The operating speed up to this point is the same as that of the sampling rate of the ADC 12-1.

The resampler 34 resamples the subcarrier signal according to the operating speed of the AEQ 35. For example, the data rate is multiplied by an integer multiple (e.g., twice) and then divided by 4 which is the number of subcarriers (64 G×2/4), and the divided data rate is down sampled. Each of the AEQs 35-1 to 35-4 performs an equalization processing with a ¼ operating clock. The total processing amount of the 4 subcarriers is the same as the processing amount of the single carrier processing and the power consumption is is the same as that in the single carrier processing.

Since each of the FECs 36-1 to 36-4 has a throughput of ¼ (e.g., 100 Gbps), it is possible to increase the number of repetitions by a maximum of four times, and when the number of repetitions is not increased, the power consumption may be reduced. Each of the client side transmission interfaces 37-1 to 37-4 is operable with a throughput of ¼, the total processing amount of the 4 subcarriers is the same as that of the single carrier, and the power consumption is also the same as that in the single carrier processing.

In this way, the signal processing core of the same circuit design may be used to cope with both the single carrier method and the subcarrier multiplexing method, and the increase in power consumption may be suppressed.

Second Embodiment

Figure 7A:
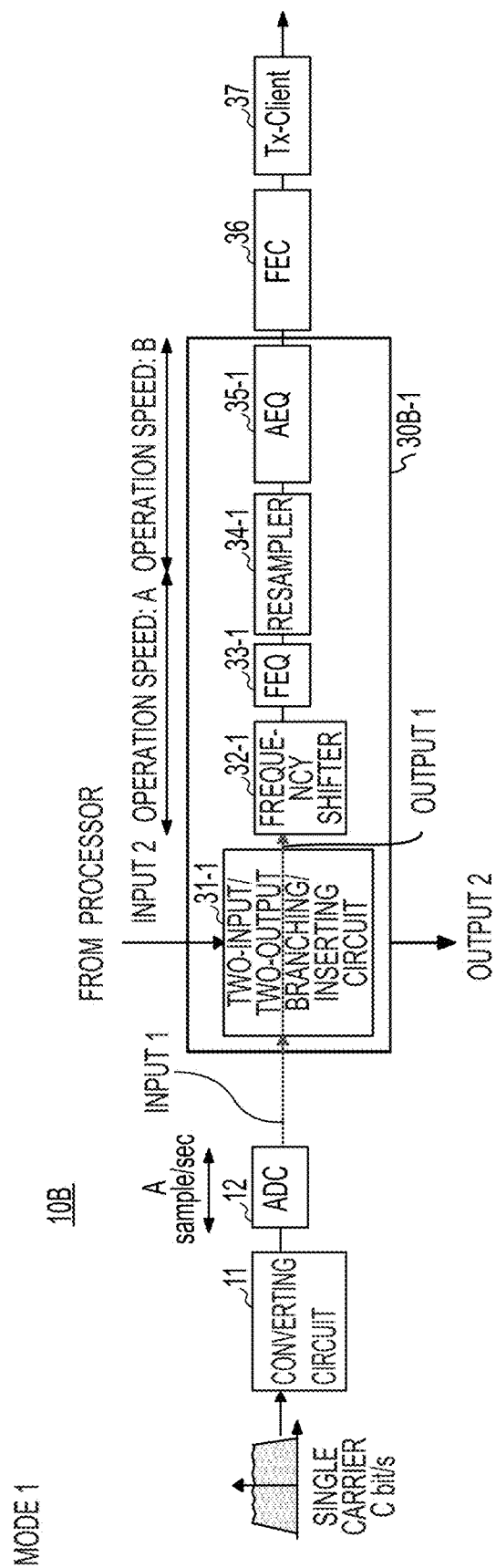

FIGS. 7A and 7B illustrate the configuration and operation of an optical receiver 10B according to a second embodiment. In the second embodiment, a plurality of common circuits 30B are arranged, and mode 1 in which a single carrier processing is performed and mode 2 in which a multicarrier processing is performed are switched. Mode 1 is used, for example, for a short-distance optical communication and mode 2 is used for a long-distance optical communication.

The optical receiver 10B of the second embodiment includes an optical receiving front end circuit 11, an ADC 12, a plurality of common circuits 30B having the same configuration, a multiplexer 38, an FEC 36, and a client side transmission interface 37. At the time of the multicarrier processing, an adaptive equalization is performed in the common circuit 30B corresponding to to each subcarrier, and the error correction and the client side processing thereafter are collectively performed.

In this case, all of the common circuits 30B-1 to 30B-4 may be arranged on one chip 50 as illustrated in FIG. 3, and each of the common circuits 30B-1 to 30B-4 may be arranged on the respective chips 50-1 to 50-4 as illustrated in FIG. 4. When all of the common circuits 30B-1 to 30B-4 are arranged on one chip, the ADC 12, the multiplexer 38, the FEC 36, and the client side transmission interface 37 may be disposed on the same chip as the plurality of common circuits 30B-1 to 30B-4.

The frequency selection processing and adaptive equalization processing in each common circuit 30B during the multicarrier processing are the same as those in the above-described first embodiment. The output of the ADC 12 is distributed to the common circuits 30B-1 to 30B-4 by the two-input/two-output branching/inserting circuits 31-1 to 31-4. In each common circuit 30B, the subcarrier component corresponding to the frequency shifter 32 and the FEQ 33 is selected, and resampling is performed by the resampler 34 at the operating speed suitable for the adaptive equalization. Each subcarrier subjected to the adaptive equalization processing is multiplexed by the multiplexer 38 and transmitted to a client side network after the error correction.

In this configuration, the signal processing core of the same circuit design may be used to cope with both the single carrier method and the subcarrier multiplexing method, and the increase in power consumption may be suppressed.

Third Embodiment

Figure 8A:
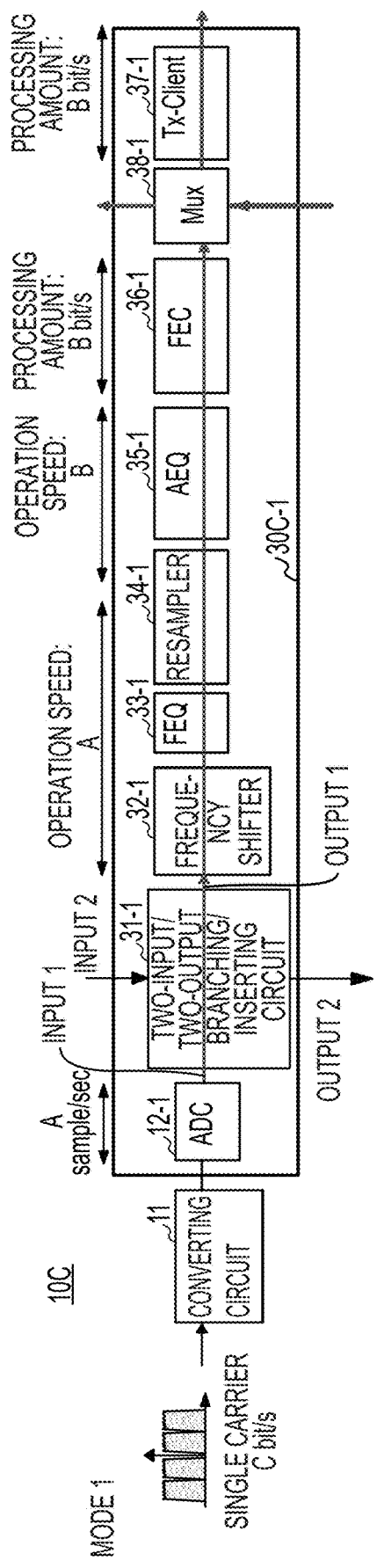

FIGS. 8A and 8B illustrate the configuration and operation of an optical receiver 10C of a third embodiment. In the third embodiment, the optical receiver 10C includes a plurality of common circuits 30C-1 to 30C-4 having the same configuration as the optical receiving front end circuit 11. Each common circuit 30C includes an ADC 12, a two-input/two-output branching/inserting circuit 31, a frequency shifter 32, an FEQ 33, a resampler 34, an AEQ 35, an FEC 36, a multiplexer (indicated as "Mux" in the figure) 38, and a client side transmission interface 37.

The common circuits 30C-1 to 30C-4 have the same circuit design and have ADCs 12-1 to 12-4, respectively. As in the first embodiment, one common circuit, for example, the ADC 12-1 of the common circuit 30C-1 is used. The ADCs 12-2 to 12-4 of the other common circuits 30C-2 to 30C-4 are also in the OFF state both in the single carrier processing and in the multicarrier processing.

The client side transmission interface 37-1 of the common circuit 30C-1 is used, and the client side transmission interfaces 37-2 to 37-4 of the other common circuits 30C-2 to 30C-4 are not used and are in the OFF state.

The operation at the time of the single carrier processing is the same as that of the single carrier processing of the first embodiment and the second embodiment described above. The signals that have been error corrected by the FEC 36-1 pass through a multiplexer 38-1 and are output from the client side transmission interface 37-1.

At the time of the multicarrier processing, the signals digitally sampled by the ADC 12-1 are distributed to the common circuits 30C-1 to 30C-4 by the two-input/two-output branching/inserting circuits 31-1 to 31-4, and subjected to an extraction of the subcarrier components and a dispersion compensation thereof, an adaptive equalization, and an error correction processing.

A multiplexer 38-4 of the common circuit 30C-4 outputs the signal-processed subcarrier signal to a multiplexer 38-3 of the adjacent common circuit 30C-3 by the control signal from the processor 20 (see, e.g., FIGS. 2 to 4). The multiplexer 38-3 multiplexes the subcarrier signal that has been signal-processed by the common circuit 30C-3 and the subcarrier signal received from the adjacent circuit, and outputs the multiplexed signals to a multiplexer 38-2 of the common circuit 30C-2. Finally, all the subcarrier signals are multiplexed by a multiplexer 38-4 of the common circuit 30C-1 and output from the client side transmission interface 37-1.

Also, in this configuration, the signal processing core of the same circuit design may be used to cope with both the single carrier method and the subcarrier multiplexing method, and the increase in power consumption may be suppressed.

Other Configuration Example 1

Figure 9:
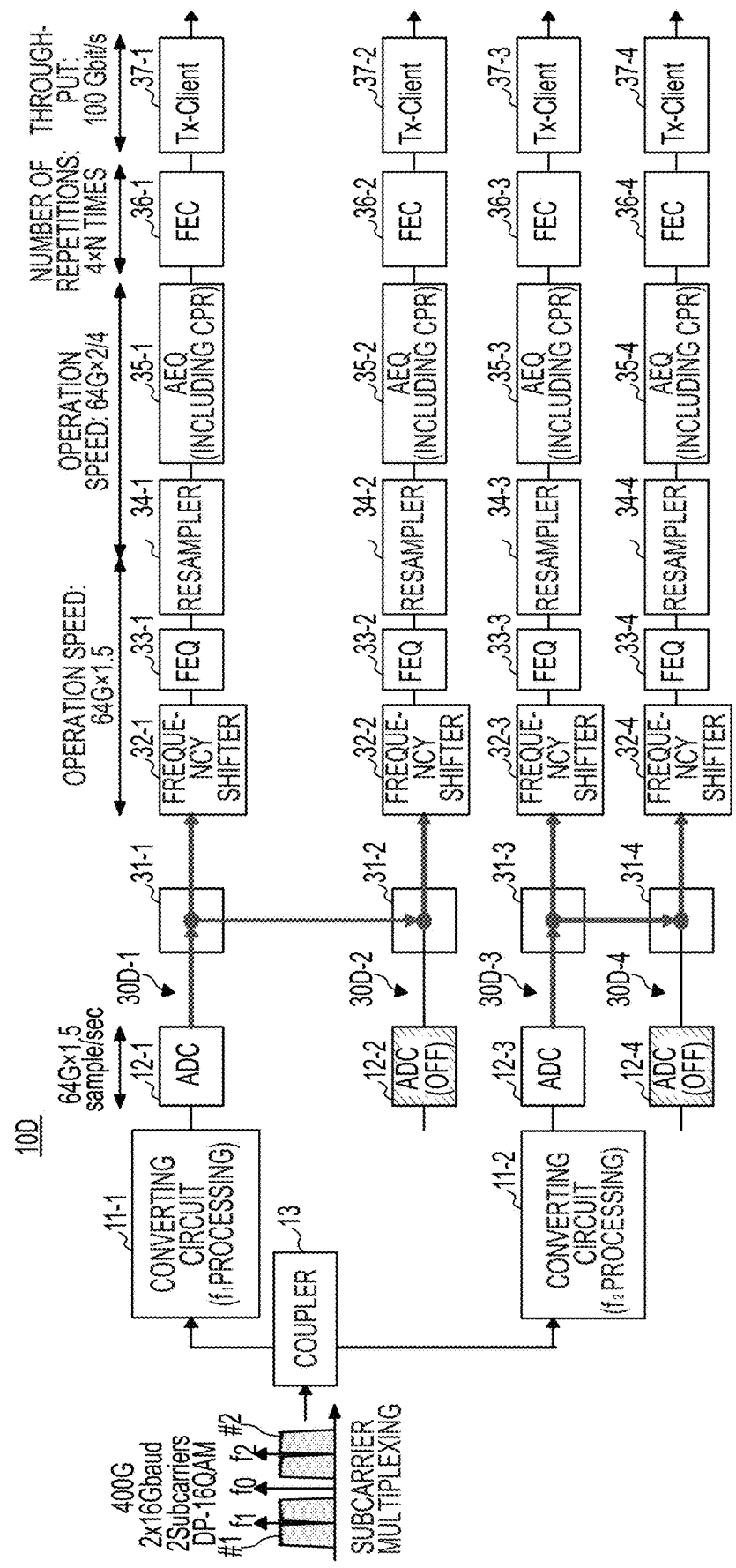
FIG. 9 is another configuration example of the optical receiver in which two subcarriers are multiplexed.

FIG. 9 illustrates a configuration example of the optical receiver when four subcarriers are processed by two optical Rx front ends. As an example, an optical receiver 10D receives a signal in which subcarrier #1 and subcarrier #2 are multiplexed at a modulation rate of 2×16 Gbaud. When it is assumed that the carrier wave frequency of the subcarrier multiplex signal is $f_0$, the center frequency of subcarrier #1 is $f_1(f_1<f_0)$ and the center frequency of subcarrier #2 is $f_2(f_0<f_2)$. This transmission method may reduce the waveform distortion at the optical Rx front end and the ADC because the analog bandwidth required for the ADC becomes narrower than when it is received at one optical Rx front end. Since the transmission method of FIG. 9 may reduce the performance deterioration caused by the Rx front end and the ADC, the transmission performance is further improved. Thus, the transmission method is suitable for communication in an inter-city or long-haul (LH) network covering hundreds to thousands of kilometers.

The optical receiver 10D includes an optical coupler (abbreviated as "coupler" in the figure) 13, optical receiving front end circuits 11-1 and 11-2, and a plurality of common circuits 30D-1 to 30D-4. The common circuits 30D-1 to 30D-4 have ADCs 12-1 to 12-4 in the same manner as the first embodiment (see, e.g., FIGS. 5A and 5B). The operation of each circuit included in each of the common circuits 30D-1 to 30D-4 is controlled by the processor 20.

The difference from the first embodiment is that in response to the processing of the two subcarriers, two common circuits, for example, the ADCs 12-1 and 12-3 in the common circuits 30D-1 and 30D-3 become in the ON state, and the ADCs 12-2 and 12-4 in the other common circuits 30D-2 and 30D-4 become in the OFF state.

The optical signal received by the optical receiver 10D is split into two by the optical coupler 13 and received by the optical receiving front end circuits 11-1 and 11-2. The optical receiving front end circuit 11-1 detects subcarrier #1 by a local oscillation of frequency $f_1$ and outputs an analog electric signal to the ADC 12-1. The optical receiving front end circuit 11-2 detects subcarrier #2 by a local oscillation of frequency $f_2$ and outputs an analog electric signal to the ADC 12-3.

The signals digitally sampled by the ADC 12-1 are distributed between the common circuits 30D-1 and 30D-2 by the two-input/two-output branching/inserting circuits 31-1 and 31-2. The ADC 12-2 is in the OFF state. In the common circuit 30D-1, the subcarrier component of the lower sideband of the center frequency $f_1$ of subcarrier #1 is processed and output from the client side transmission interface 37-1. In the common circuit 30D-2, the subcarrier component of the upper sideband of the center frequency $f_1$ of subcarrier #1 is processed and output from the client side transmission interface 37-2.

Similarly, the signals digitally sampled by the ADC 12-3 are distributed between the common circuits 30D-3 and 30D-4 by the two-input/two-output branching/inserting circuits 31-3 and 31-4. The ADC 12-4 is in the OFF state. In the common circuit 30D-3, the subcarrier component of the lower sideband of the center frequency $f_2$ of subcarrier #2 is processed and output from the client side transmission interface 37-3. In the common circuit 30D-4, the subcarrier component of the upper sideband of the center frequency $f_2$ of subcarrier #2 is processed and output from the client side transmission interface 37-4.

It is possible to receive light using the optical Rx front end circuits 11-1 and 11-2, when the analog bandwidth is narrow. It is also possible to reduce the penalty due to incomplete devices by using only the optical receiving front end and a low-frequency side having a small distortion of the ADC.

Figure 10:
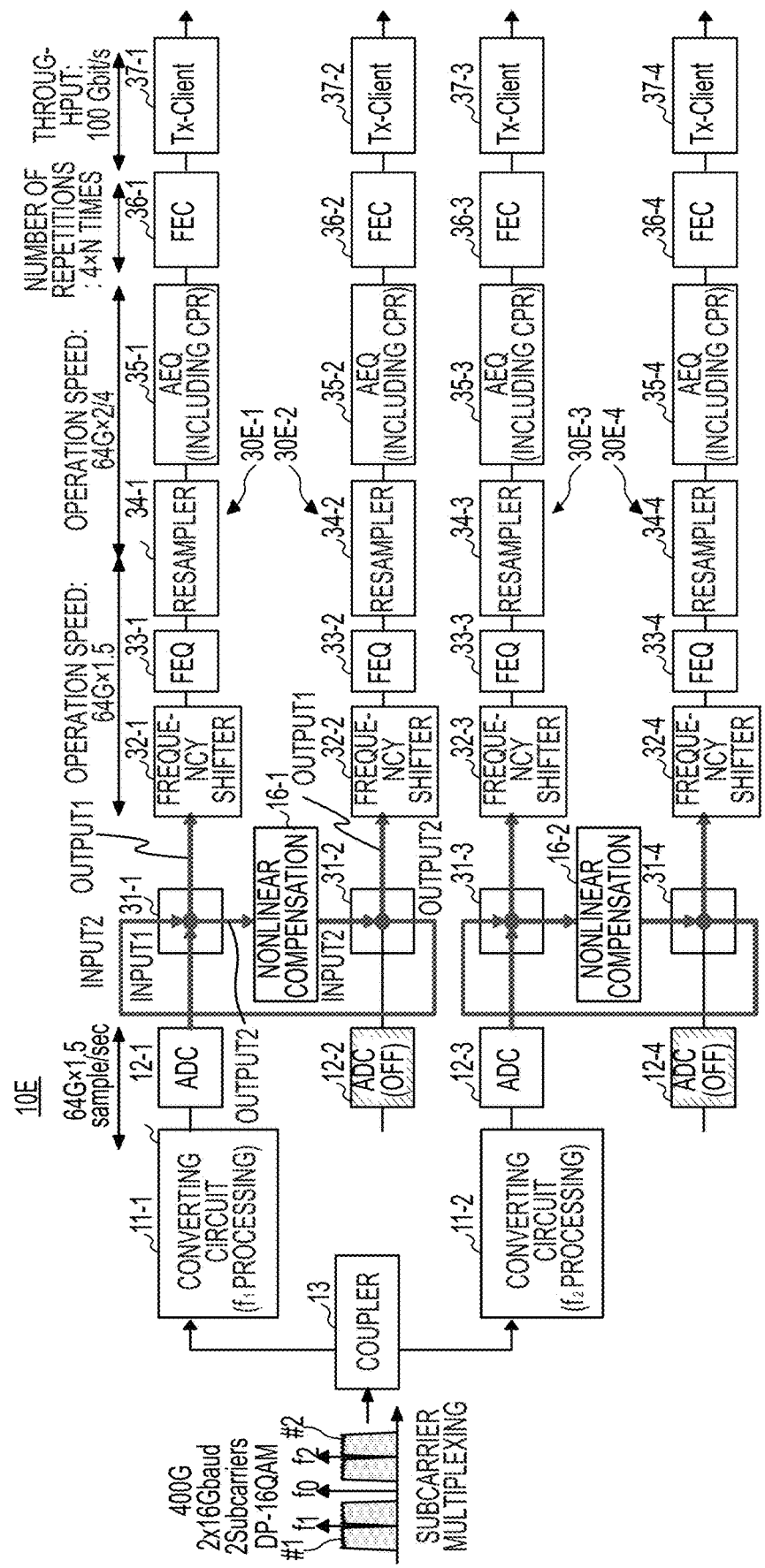
FIG. 10 illustrates a configuration having a nonlinear compensation as a modification of FIG. 9.

FIG. 10 illustrates the configuration of an optical receiver 10E as a modification of FIG. 9. In the example illustrated in FIG. 10, a function of compensating for the nonlinear waveform distortion of the transmission path (optical fiber) is added to a reception processing of two subcarrier signals received at one Rx front end. A nonlinear compensation circuit 16-1 is disposed between the two-input/two-output branching/inserting circuit 31-1 of the common circuit 30E-1 and the two-input/two-output branching/inserting circuit 31-2 of the common circuit 30E-2. Similarly, a nonlinear compensation circuit 16-2 is provided between the two-input/two-output branching/inserting circuit 31-3 of the common circuit 30E-3 and the two-input/two-output branching/inserting circuit 31-4 of the common circuit 30E-4.

The output of the ADC 12-1 is connected to the input 1 of the two-input/two-output branching/inserting circuit 31-1. The output 2 of the two-input/two-output branching/inserting circuit 31-1 is connected to the input of the nonlinear compensation circuit 16-1. The digitally sampled data in which the waveform distortion is compensated for is input to the two-input/two-output branching/inserting circuit 31-2. The output 1 of the two-input/two-output branching/inserting circuit 31-2 is connected to the input of the frequency shifter 32-2 and the output 2 is connected to the input 2 of the two-input/two-output branching/inserting circuit 31-1. The two-input/two-output branching/inserting circuit 31-1 outputs the digitally sampled data in which the nonlinearity is compensated for, which is obtained from the input 2, to the frequency shifter 32-1 at the output 1.

The same operation and configuration are suitable for the two-input/two-output branching/inserting circuits 31-1 and 31-4, and the nonlinear compensation circuit 16-2. Thus, it is possible to shape the waveform distortion caused by the nonlinear response of the long-distance optical fiber transmission and perform the signal processing at the subsequent stage.

Other Configuration Example 2

Figure 11:
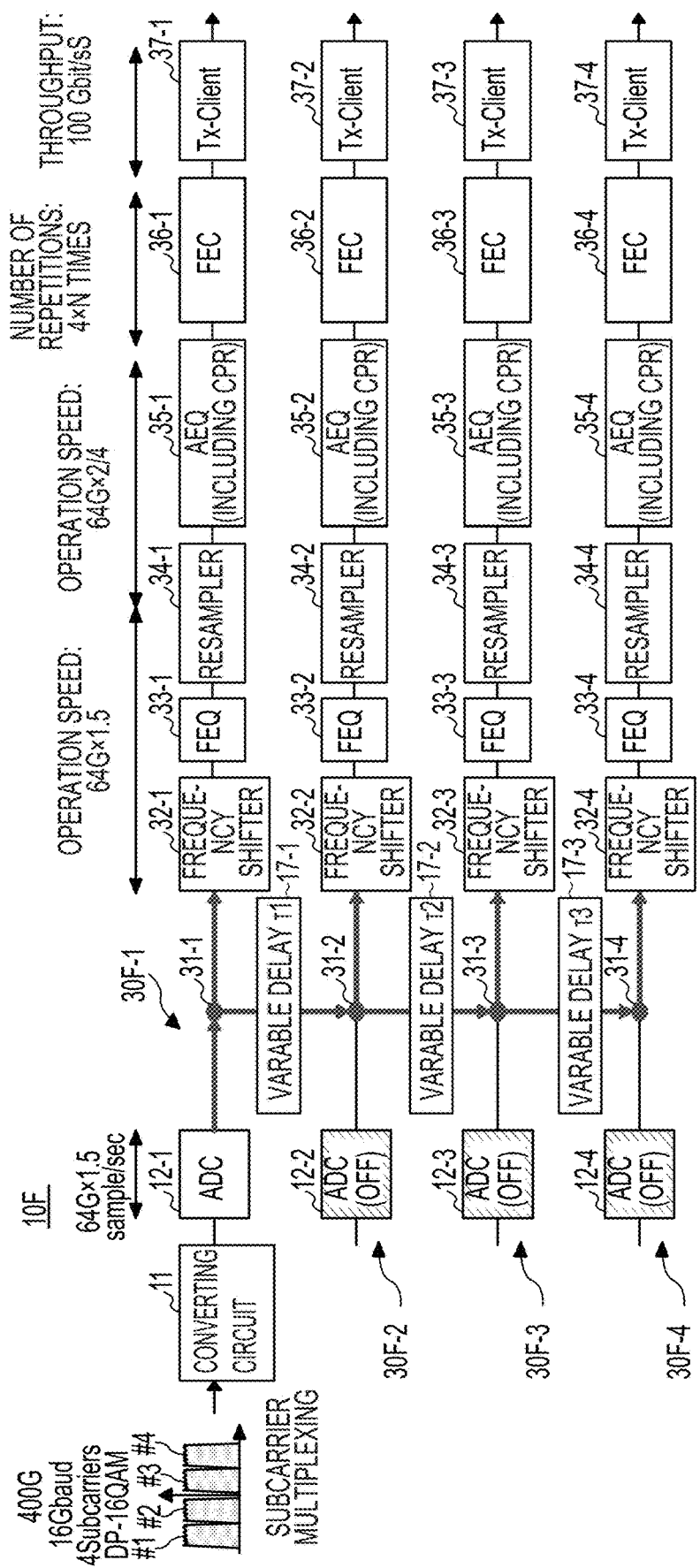
FIG. 11 illustrates another configuration example of the optical receiver.

FIG. 11 illustrates the configuration of an optical receiver 10F as another configuration example 2. In the optical receiver 10F, a group delay difference between subcarriers due to the waveform dispersion is compensated for. As in the first embodiment, it is assumed that four subcarriers #1 to #4 are transmitted in the DP-16 QAM (polarization multiplexing 16 QAM) modulation method with a transmission rate of 400 Gbps and a modulation rate of 16 Gbaud. The group delay amount of the subcarriers #1 to #4 is not necessarily the same.

Common circuits 30F-1 to 30F-4 are provided to process the subcarriers #1 to #4. The common circuits 30F-1 to 30F-4 have the same configuration as, for example, the common circuits 30A-1 to 30A-4 of the first embodiment, and an analog electric signal is input to the ADC 12-1 of the common circuit 30F-1 from the optical receiving front end circuit 11.

The difference from the first embodiment is that a variable delay is inserted between the adjacent common circuits 30 to compensate for the group delay difference between the subcarriers. The variable delay may be in any form and, for example, a variable delay buffer may be used.

A variable delay 17-1 is arranged between the two-input/two-output branching/inserting circuit 31-1 of the common circuit 30E-1 and the two-input/two-output branching/inserting circuit 31-2 of the common circuit 30E-2. A variable delay 17-2 is arranged between the two-input/two-output branching/inserting circuit 31-2 of the common circuit 30E-2 and the two-input/two-output branching/inserting circuit 31-3 of the common circuit 30E-3. A variable delay 17-3 is arranged between the two-input/two-output branching/inserting circuit 31-3 of the common circuit 30E-3 and the two-input/two-output branching/inserting circuit 31-4 of the common circuit 30E-4.

The delay amount of the variable delay 17-1 is $\tau 1$. The delay amount of the variable delay 17-2 is $\tau 2$. The delay amount of the variable delay 17-3 is $\tau 3$. The delay amounts $\tau 1$, $\tau 2$, and $\tau 3$ are set to values at which the delay amounts between the subcarriers are set.

For example, when the group delay amount of the outermost subcarrier (subcarrier #1 or #4 in this example) is the greatest, the subcarrier is processed by the circuit farthest from the common circuit 30F-1. This may be achieved by adjusting the shifting amounts of the frequency shifters 32-1 to 32-4. It is possible to reduce the buffer for variable delay by signal processing the outer subcarrier with a large group delay amount (on the short-wavelength or long-wavelength side) at the core far from the first common circuit 30F-1.

In the example of FIG. 11, the variable delays 17-1 to 17-3 are inserted using the input/output terminals of the two-input/two-output branching/inserting circuits 31-1 to 31-4, but the present disclosure is not limited to this example. Since a delay of each subcarrier due to the waveform dispersion should be compensated for until the delay is output as a client signal, the delay may be corrected by the FEQs 33-1 to 33-4. Alternatively, the delay may be corrected by the position of a frame header added to each subcarrier after the FECs 36-1 to 36-4.

Other Configuration Example 3

Figure 12:
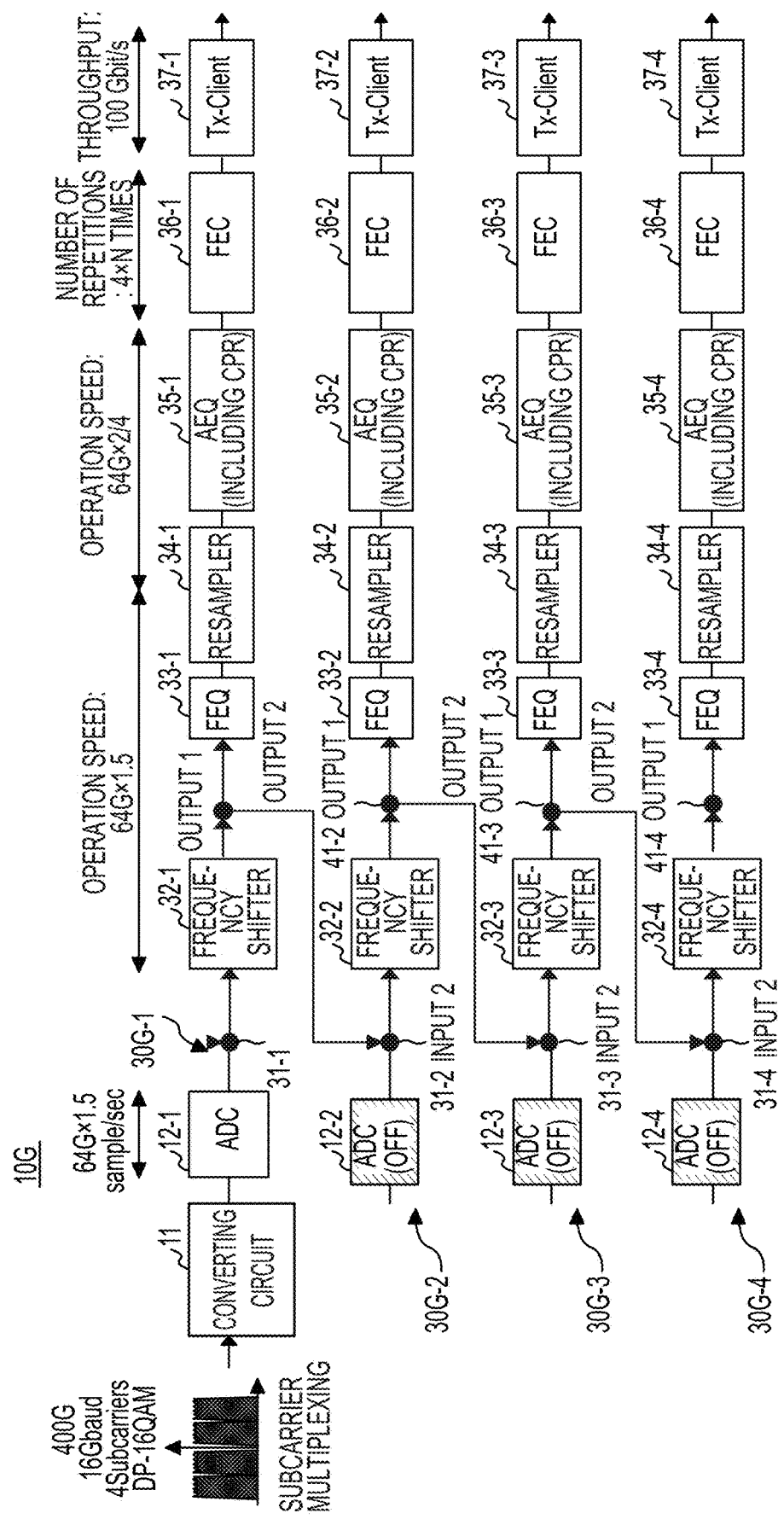
FIG. 12 illustrates a further configuration example of the optical receiver.

FIG. 12 illustrates the configuration of an optical receiver 10G as another configuration example 3. Each common circuit 30G of the optical receiver 10G includes a first two-input/two-output branching/inserting circuit 31 at the front stage of a frequency shifter 32 and a second two-input/two-output branching/inserting circuit 41 at the rear stage of the frequency shifter 32. The digital signals distributed between the common circuits 30G-1 to 30G-4 are branched at the back of the frequency shifter 32 and input from the front stage of the frequency shifter 32 of the adjacent common circuit 30G.

The output 1 of the two-input/two-output branching/inserting circuit 41-1 is connected to the input of the FEQ 33-1 of the rear stage and the output 2 is connected to the input 2 of the two-input/two-output branching/inserting circuit 31-2 of the adjacent common circuit 30G. The digital signals that have received the frequency shift are input to the frequency shifter 32-2 of the common circuit 30G-2. Similarly, the digital signals that have received the frequency shift are distributed sequentially between the common circuit 30G-2 and the common circuit 30G-3, and between the common circuit 30G-3 and the common circuit 30G-4.

In this configuration, the frequency is shifted based on the frequency shift amount compensated by the previous common circuit 30G. The frequency shift amount may be reduced by shifting only the difference from the frequency shift amount processed up to the front stage toward the center frequency of the target subcarrier.

Other Configuration Example 4

Figure 13:
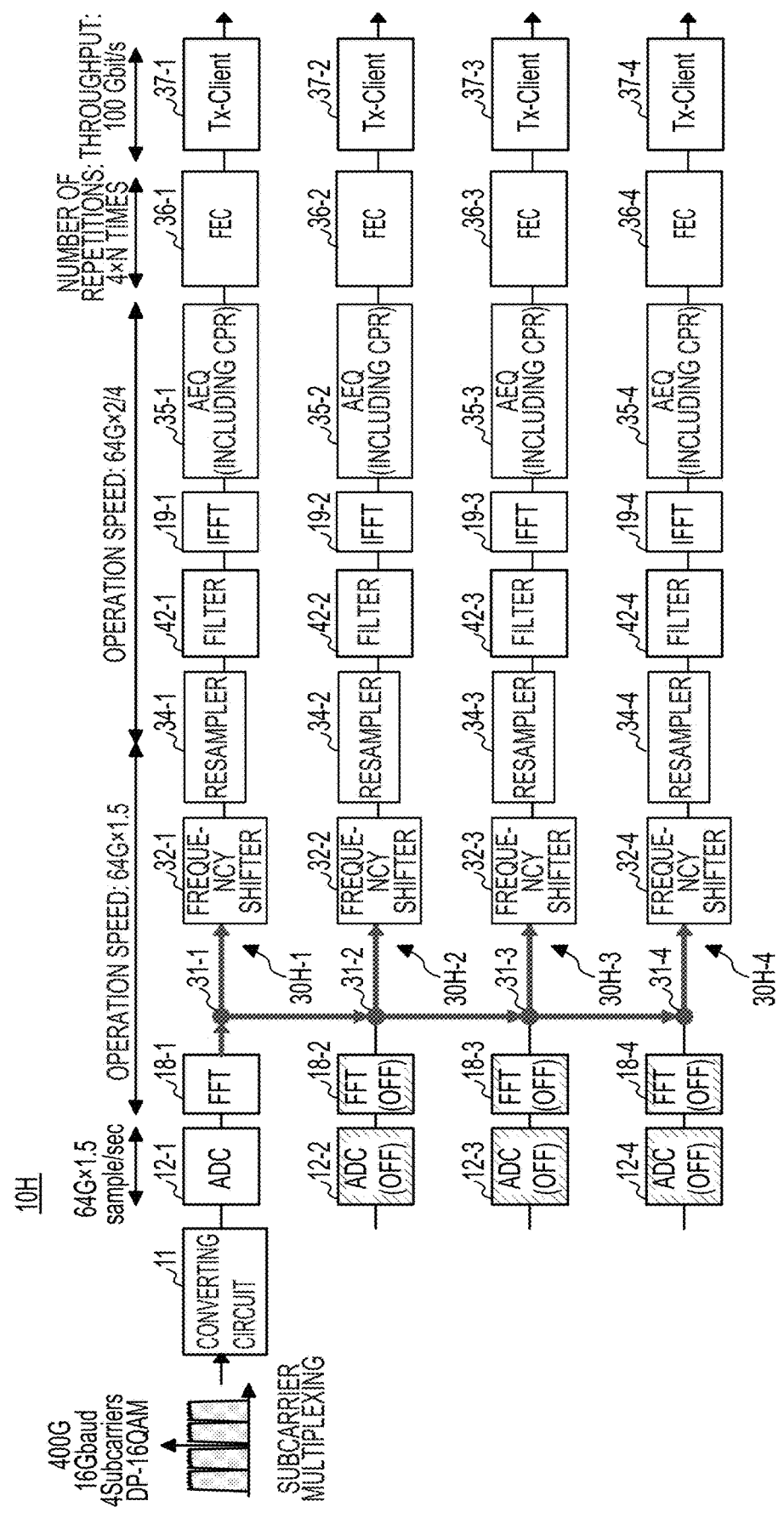
FIG. 13 illustrates still another configuration example of the optical receiver.

FIG. 13 illustrates the configuration of an optical receiver 10H as another configuration example 4. The optical receiver 10H includes a plurality of common circuits 30H-1 to 30H-4 having the same configuration as the optical receiving front end circuit 11. The common circuit 30H-1 is used for the single carrier processing and the common circuits 30H-1 to 30H-4 are used for the multicarrier processing.

Each common circuit 30H includes an ADC 12, a fast Fourier transformer (FFT) 18, a two-input/two-output branching/inserting circuit 31, a frequency shifter 32, a resampler 34, a filter 42, an inverse fast Fourier transformer (IFFT) 35, an adaptive equalizer 35, an FEC 36, and a client side transmission interface 37.

A fixed adaptive equalizer (FEQ) is formed by the FFT 18, the filter 42, and the IFFT 19, and an equalization is performed in the frequency domain. The digital signals are distributed among the plurality of common circuits 30H-1 to 30H-4 by the two-input/two-output branching/inserting circuits 31-1 to 31-4 arranged in the middle of the FEQ.

The ADC 12-1 and the FFT 18-1 of the first common circuit 30H-1 become in the ON state and the ADCs 12-2 to 12-4 and the FFTs 18-2 to 18-4 of the other common circuits 30H-2 to 30H-4 become in the OFF state.

The signals converted into the frequency domain signals by the FFT 18-1 are output to the frequency shifter 32-1 by the two-input/two-output branching/inserting circuit 31-1, and are distributed to the adjacent common circuit 30H-2. The frequency shifter 32-1 and the filter 42-1 select and equalize subcarriers in the frequency domain. The signals converted into the time domain signals by the IFFT 19 are subjected to an adaptive equalization processing by the adaptive equalizer 35. This adaptive equalization processing may include removal of optical carrier wave phase noise (CPR: carrier phase recovery). After that, the signals that have been error corrected by the FEC 36-1 are output as client signals from the client side transmission interface 37-1.

Also, in this configuration, it is possible to switch between the single carrier processing and the multicarrier processing without changing the circuit configuration and without increasing the total consumption electrode.

The configurations of the first to third embodiments and the other configuration examples 1 to 4 may be combined as appropriate. The common circuit 30C of the third embodiment (see, e.g., FIGS. 8A and 8B) may be used for the processing of the two subcarrier multiplexing signals in the configuration example 1 and the modification thereof (see, e.g., FIGS. 9 and 10). In this case, for each subcarrier, the digitally signal-processed signals are multiplexed and output from one client side transmission interface. The error correction by the FEC 36 and the processing by the client side transmission interface 37 may be performed after the outputs of the plurality of common circuits 30 are multiplexed. In addition, a nonlinear compensation, a compensation for group delay differences, and a support for two subcarrier multiplexes may be appropriately performed.

Configuration Example of Optical Transmitter

Figure 14:
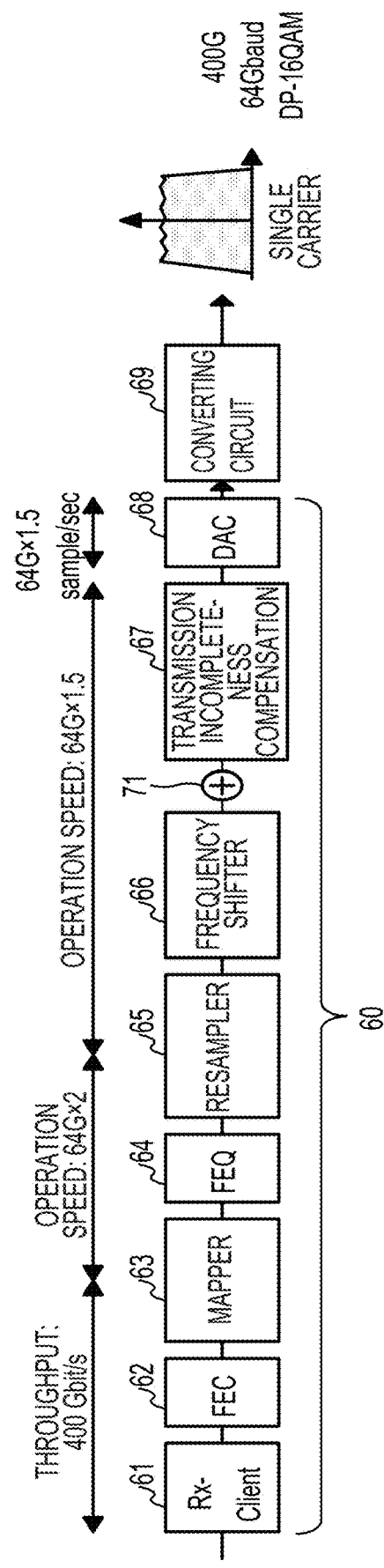
FIG. 14 is a diagram illustrating an operation when an optical transmitter transmits a single carrier signal.

FIGS. 14 and 15 illustrate a configuration example of an optical transmitter 40. The optical transmitter 40 may switch between the transmission in the single carrier method and the transmission in the subcarrier multiplexing method. FIG. 14 illustrates the operation when the single carrier signal is transmitted, and FIG. 15 illustrates the operation when the subcarrier multiplexing signal is transmitted. The transmission in the single carrier method is used, for example, in the data center interconnect (DCI). The transmission in the subcarrier multiplexing method is used, for example, for a metro network.

The optical transmitter 40 includes common circuits 60-1 to 60-4 (collectively referred to as "common circuit 60" as appropriate) as a signal processing sequence having the same configuration. At the time of transmitting the single carrier, one common circuit 60 connected to an optical transmitting front end circuit 69 is used among the plurality of common circuits 60-1 to 60-4.

The common circuit 60 includes, for example, a client side receiving interface (indicated as "Rx Client" in the figure) 61, an FEC encoding circuit 62, a mapper 63, a fixed equalizer (indicated as "FEQ") 64, a resampler 65, a frequency shifter 66, an adder 71, a transmission incompleteness compensation circuit 67, a DAC 68, and an optical transmitting front end circuit 69.

In FIG. 14, at the time of transmitting the single carrier, the client signal received at the client side receiving interface 61 is encoded with an error correction code added thereto by the FEC encoding circuit 62, and is mapped to a signal point (symbol point) on a constellation by the mapper 63. The waveform is equalized by the FEQ 64 and the sampling rate is adjusted to the operating speed of the DAC 68 by the resampler 65. The carrier wave frequency is selected by the frequency shifter 66 and passes through the adder 71 so as to be input to the transmission incompleteness compensation circuit 67.

The transmission incompleteness compensation circuit 67 compensates for the incompleteness of the analog portion of the optical transmitter 40. Examples of the incompleteness of the analog portion include the nonlinearity of the analog electric signal that drives an optical modulator of the optical transmitting front end circuit 69, and the incompleteness of the extinction ratio of an IQ modulator. The signals that are compensated for incompleteness are converted into analog electric signals by the DAC 68, converted into an optical signal by the optical transmitting front end circuit 69, and output to the transmission path.

In FIG. 15, when subcarrier multiplexing signals are transmitted, the client signals transmitted on each subcarrier are processed by the common circuits 60-1 to 60-4. The transmission incompleteness compensation circuits 67-2 to 67-4 and the DACs 68-2 to 68-4 of the common circuits 60-2 to 60-4 are in the OFF state.

The digital signals set to the center frequencies of the respective subcarriers in the frequency shifters 66-1 to 66-4 are summed on the frequency axis by the adders 71-1 to 71-4, and input to the transmission incompleteness compensation circuit 67-1. The signals that are compensated for incompleteness are converted into analog electric signals by the DAC 68-1, converted into optical signals by the optical transmitting front end circuit 69, and output to the transmission path.

When the processing amounts and operating speeds of the respective common circuits 60-1 to 60-4 are matched, the processing amount and operation speed at the time of transmitting the single carrier are the same, and the power consumption is not increased. By providing a plurality of common circuits 60-1 to 60-4 having the same configuration, it is possible to switch between the single carrier transmission and the subcarrier multiplex transmission by a simple circuit design on the transmission side without increasing the power consumption.

Switching Example Using Pluggable Module

Figure 16A:
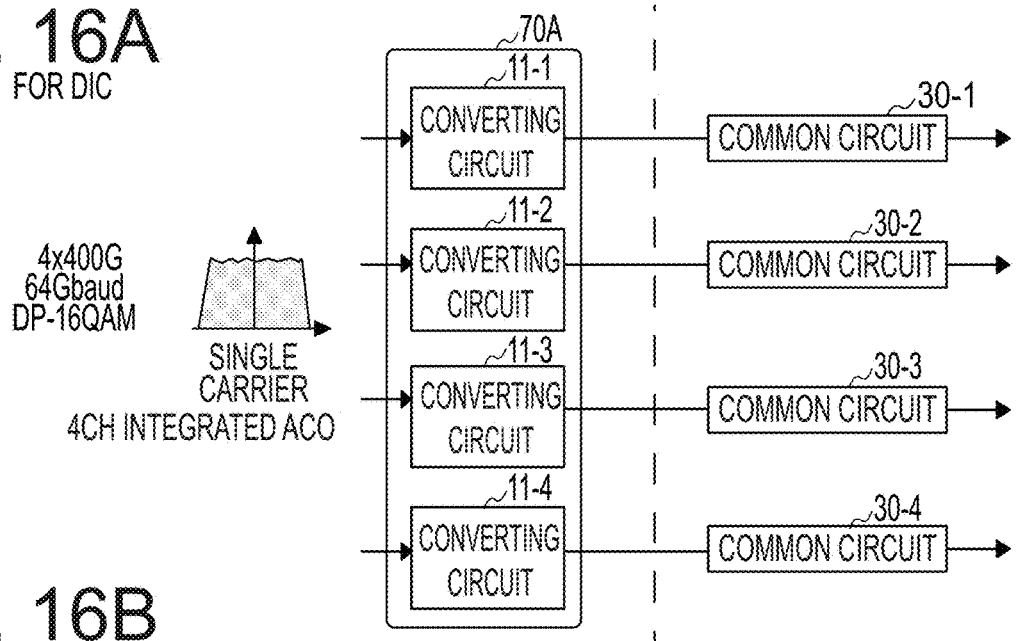
FIGS. 16A to 16C are diagrams illustrating an example of switching by a pluggable module.
Figure 16B:
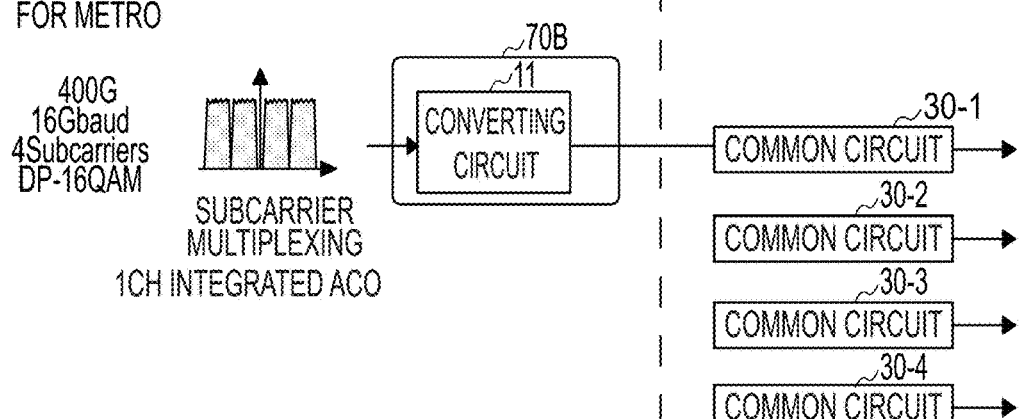
Figure 16C:
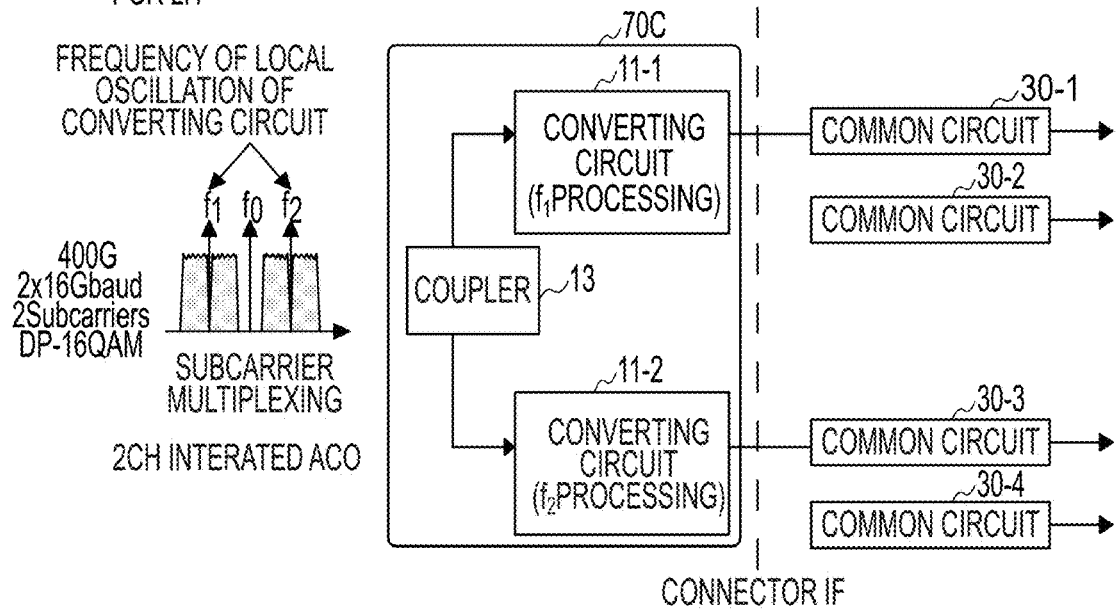

FIGS. 16A to 16C are diagrams illustrating a switching example using a pluggable module. In FIG. 16A, the single carrier transmission is performed using a pluggable module 70A for DCI. In FIG. 16B, four subcarrier multiplexing transmission is performed using a pluggable module 70B for metro. In FIG. 16C, two subcarrier multiplexing transmission is performed using a pluggable module 70C for LH.

The pluggable modules 70A to 70C are, for example, pluggable modules based on analog coherent optics (CFP2 ACO), and an optical Rx receiving front end and a common circuit ADC are connected with each other by a connector IF. The common circuits 30-1 to 30-4 may be formed on one chip or may be formed on separate chips to be mounted on a common interposer substrate.

The pluggable module 70A for DCI in FIG. 16A is a 4-channel integrated ACO module having the optical receiving front end circuits 11-1 to 11-4 that correspond to the common circuits 30-1 to 30-4, respectively. Each of the optical receiving front end circuits 11-1 to 11-4 receives four optical signals of 400 GHz in a single carrier method. The received signals are signal-processed and output by the common circuits 30-1 to 30-4 for each channel.

The pluggable module 70B for metro in FIG. 16B is a one-channel integrated ACO module having one optical receiving front end circuit 11. The optical receiving front end circuit 11 is connected to the common circuit 30-1. The optical receiving front end circuit 11 receives the optical signals in which four subcarriers are multiplexed and outputs the analog electric signal to the common circuit 30-1. As described with reference to FIGS. 5A and 5B, the analog electric signal is converted into a digital signal by the ADC 12-1 of the common circuit 30-1, and distributed to the common circuits 30-1 to 30-4 by the two-input/two-output branching/inserting circuits 31-1 to 31-4.

The pluggable module 70C for LH in FIG. 16C is a two-channel integrated module having an optical coupler 13 and two optical receiving front end circuits 11-1 and 11-2. Since the signal bandwidth to be processed by a single optical receiving front end circuit is smaller than that in FIG. 16B, it is also possible to use an optical receiving front end circuit having a narrow bandwidth. In addition, it may be expected that the waveform distortion at the receiving front end becomes smaller when the optical receiving front end having a wide bandwidth is used.

The optical receiving front end circuit 11-1 detects the subcarrier having the center frequency $f_1$ and outputs the analog electric signal to the common circuit 30-1. The analog electric signal is converted into a digital signal by the ADC of the common circuit 30-1 and distributed between the common circuits 30-1 and 30-2 for signal processing. The optical receiving front end circuit 11-2 detects the subcarrier having the center frequency $f_2$ and outputs the analog electric signal to the common circuit 30-3. The analog electric signal is converted into a digital signal by the ADC of the common circuit 30-3 and distributed between the common circuits 30-3 and 30-4 for signal processing.

By using the pluggable modules 70A to 70C, the common circuits 30-1 to 30-4 may be fixed and switching among the three transmission methods may be easily performed.

System Configuration Example

FIGS. 17A and 17B illustrate a system configuration example using the common circuit configuration of the first embodiment (see, e.g., FIGS. 5A and 5B and FIG. 6). This system configuration switches between mode 1 for short-distance communication and mode 2 for short-distance and long-distance communication. It is possible to easily switch between mode 1 and mode 2 by using at least a part of the pluggable modules 70A to 70C in FIGS. 16A to 16C.

In mode 1 for short-distance communication, the single carrier processing is performed in each of the common circuits 30-1 to 30-5 (indicated as "core" in the figure) (appropriately referred to as "30-$k$"). Each common circuit 30-$k$ is connected to the corresponding optical transmitting/receiving front end circuit 80-$k$ (indicated as "optical Tx/Rx front end" in the figure). The optical signals in the single carrier method transmitted from the line side are converted into electric signals by the receiving side circuit of the optical transmitting/receiving front end circuit 80-$k$, subjected to a digital signal processing by the common circuit 30-$k$, and output to a framer 95. The framer converts the client signals output from each common circuit 30-$k$ into a frame format of the client side network and outputs the converted client signals to a client side optical transceiver 90-$k$.

In mode 1, it is possible to connect the optical transmitting/receiving front end circuit 80-$k$ corresponding to each common circuit 30-$k$ using, for example, the pluggable module 70A of FIG. 16A.

In mode 2 in which short-distance communication and long-distance communication are mixed, two subcarrier multiplexing signals are processed using the common circuits 30-1 to 30-4, and signals in the single carrier method are processed by the common circuit 30-5. An optical transmitting/receiving front end circuit 80-1 is connected to the common circuit 30-1 and distributes the multiplexed subcarrier signals between the common circuits 30-1 and 30-2 to perform a digital signal processing. An optical transmitting/receiving front end circuit 80-2 is connected to the common circuit 30-3, and the other multiplexed subcarrier signals are distributed between the common circuits 30-3 and 30-4 to perform a digital signal processing. An optical transmitting/receiving front end circuit 80-3 is connected to the common circuit 30-5, and the common circuit 30-5 performs a digital signal processing on the single carrier signal.

Signals output from the common circuits 30-1 and 30-2 are subjected to a frame processing in the framer 95 and output to a client side optical transistor 90-1. Signals output from the common circuits 30-3 and 30-4 are subjected to a frame processing in the framer 95 and output to a client side optical transistor 90-3. Signals output from the common circuit 30-5 are subjected to a frame processing in the framer 95 and output to the client side optical transceiver 90-3.

In mode 2, a required connection relationship may be implemented between the optical transmitting/receiving front end circuit 80 and the common circuit 30 using, for example, the pluggable module 70C for LH in FIG. 16C and the pluggable module 70B in FIG. 16B.

Figure 18A:
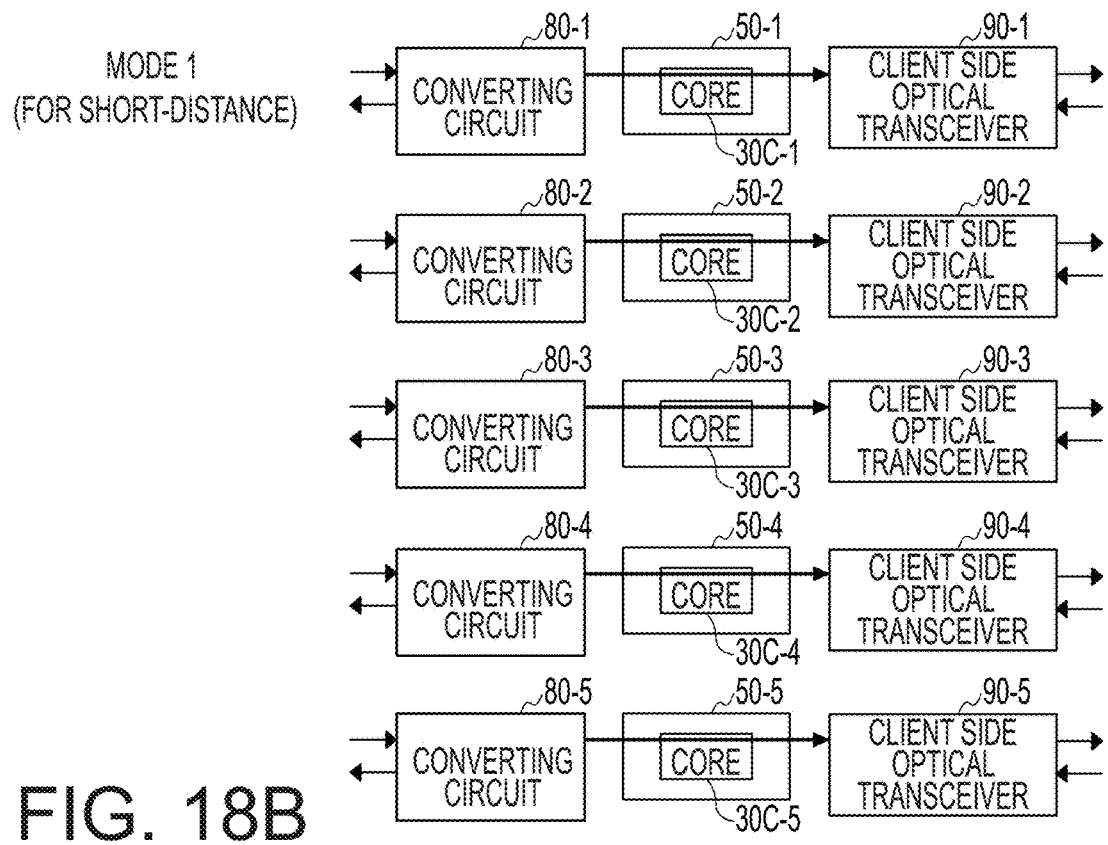
FIGS. 18A and 18B are diagrams illustrating a system configuration example according to the third embodiment.
Figure 18B:
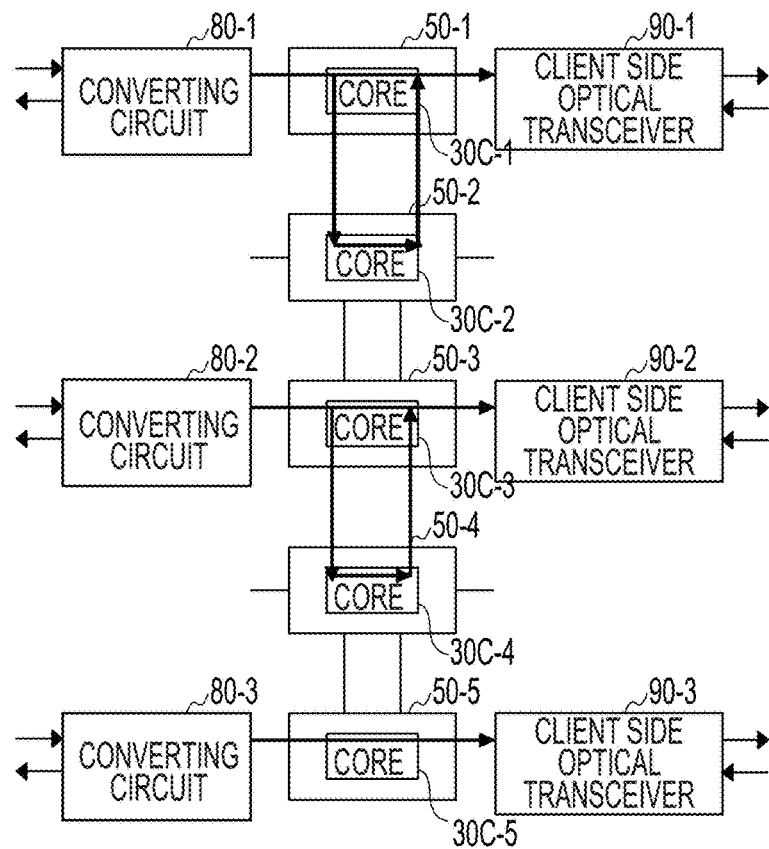

FIGS. 18A and 18B are system configuration examples using a common circuit configuration of the third embodiment (see, e.g., FIGS. 5A and 5B and FIG. 6). Here, switching is also performed between mode 1 for short-distance communication and mode 2 in which short-distance communication and long-distance communication are mixed. The basic structure of the system is the same as that in FIGS. 17A and 17B.

The difference from FIGS. 17A and 17B is that the common circuit 30C of FIGS. 8A and 8B is used as a common circuit and the digital signal multiplexed for each subcarrier is output from a predetermined common circuit 30C at the time of the multicarrier processing.

In mode 2 in which short-distance communication and long-distance communication are mixed, two subcarrier multiplexing signals are processed using the common circuits 30C-1 to 30C-4, and the signals in the single carrier method are processed by the common circuit 30C-5. An optical transmitting/receiving front end circuit 80-1 is connected to the common circuit 30C-1, and the multiplexed subcarrier signals are distributed between the common circuits 30C-1 and 30C-2 to perform a digital signal processing. The signals processed by the common circuit 30C-2 are supplied to the common circuit 30C-1, multiplexed with the signals processed by the common circuit 30C-1, and output to the client side optical transceiver 90-1.

An optical transmitting/receiving front end circuit 80-2 is connected to the common circuit 30C-3, and the other multiplexed subcarrier signals are distributed between the common circuits 30C-3 and 30C-4 to perform a digital signal processing. The signals processed by the common circuit 30C-4 are supplied to the common circuit 30C-3, multiplexed with the signals processed by the common circuit 30C-3, and output to a client side optical transceiver 90-2.

The system configurations of FIGS. 18A and 18B may easily switch between mode 1 and mode 2 by using at least a portion of the pluggable modules 70A to 70C of FIGS. 16A to 16C.

Although the present disclosure has been described based on the above-specified configuration examples, the present disclosure is not limited to the above-described configuration examples, and various modifications and combinations may be made thereto. The system configurations in FIGS. 17A and 17B and FIGS. 18A and 18B may be also applied to switching between mode 1 for DCI and the processing mode of four subcarrier multiplexing signals for metro or switching between mode 2 having both short-distance and long-distance and four subcarrier multiplexing signals for metro. Also, in this case, it is possible to easily perform switching using the pluggable module illustrated in FIGS. 16A to 16C. The number of subcarrier multiplexes is not limited to the multiplexing of two subcarriers and four subcarriers, and the present disclosure may be applied to multiplexing of eight subcarriers or more. For subcarrier multiplexing, a subcarrier coordination control may be combined. The subcarrier coordination control includes, for example, coordination control of optical frequencies.

The way in which the common circuit 30 is configured may be appropriately designed. A plurality of common circuits having the same circuit configuration are arranged irrespective of the internal design of the common circuit 30 to switch the processing paths. Thus, flexible optical transmission is implemented by suppressing an increase in power consumption by a simple circuit design.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
   a first converting circuit configured to convert an optical signal into an electric signal;
   a plurality of common circuits, each of which has a same circuit configuration, and configured to perform a digital signal processing on the electric signal; and
   a processor configured to select and operate one or more common circuits from among the plurality of common circuits according to whether a transmission method is a single carrier transmission or a subcarrier multiplexing transmission,
   wherein the processor is configured to select and operate common circuits based on a number of subcarriers among the plurality of common circuits when the transmission method is the subcarrier multiplexing transmission, processing speed of the digital signal processing operation of the common circuits performed on the electric signal varies depending on the number of subcarriers.

2. The optical receiver according to claim 1,
   wherein the plurality of common circuits include at least a first common circuit and a second common circuit, and in the single carrier transmission, the processor selects and operates the first common circuit such that the second common circuit is turned off and in the subcarrier multiplexing transmission, the processor selects and operates the first common circuit and the second common circuit.

3. The optical receiver according to claim 2, wherein, in the single carrier transmission, the first common circuit processes and outputs the electric signal by the first common circuit, and in the subcarrier multiplexing transmission, the first common circuit distributes the electric signal to and from the second common circuit, processes a first subcarrier signal by the first common circuit, and processes a second subcarrier signal by the second common circuit.

4. The optical receiver according to claim 3, wherein the first common circuit includes a first two-input/two-output branching/inserting circuit; the second common circuit includes a second two-input/two-output branching/inserting circuit having a same configuration as the first two-input/two-output branching/inserting circuit; in the single carrier transmission, a first output of the first two-input/two-output branching/inserting circuit provides the electric signal to a signal processing circuit in a rear stage and a second output is turned off; and in the subcarrier multiplexing transmission, the first output of the first two-input/two-output branching/inserting circuit provides the electric signal to the signal processing circuit in the rear stage and the second output supplies the electric signal to the second common circuit at the second output.

5. The optical receiver according to claim 4, wherein the first two-input/two-output branching/inserting circuit receives the electric signal at a first input, and the second two-input/two-output branching/inserting circuit receives a second output signal of the first common circuit at a second input.

6. The optical receiver according to claim 3, wherein the first common circuit selects the first subcarrier signal in a first frequency shifter and a first fixed equalizer, and the second common circuit selects the second subcarrier signal in a second frequency shifter having a same configuration as the first frequency shifter and a second fixed equalizer having a same configuration as the first fixed equalizer.

7. The optical receiver according to claim 6, wherein in the subcarrier multiplexing transmission, the electric signal is taken out from a rear stage of the first frequency shifter of the first common circuit and input to a front stage of the second frequency shifter of the second common circuit.

8. The optical receiver according to claim 3, wherein in a first resampler, the first common circuit resamples the first subcarrier at a speed which is suitable for an operation speed of a first adaptive equalizer in a rear stage, and in a second resampler having a same configuration as the first resampler, the second common circuit resamples the first subcarrier at a speed which is suitable for an operation speed of a second adaptive equalizer having a same configuration as the first adaptive equalizer.

9. The optical receiver according to claim 8, further comprising:

a non-linear compensation circuit disposed between the first common circuit and the second common circuit, wherein the first common circuit and the second common circuit distribute a signal in which a waveform is corrected by the non-linear compensation circuit.

10. The optical receiver according to claim 3, further comprising:

a variable delay disposed between the first common circuit and the second common circuit, wherein a group delay amount of the first subcarrier signal and the second subcarrier signal is made equal due to the variable delay.

11. The optical receiver according to claim 3, wherein the first common circuit includes a first multiplexer, the second common circuit includes a second multiplexer having a same configuration as the first multiplexer, the second multiplexer supplies a second processing signal digitized by at least the second common circuit to the first multiplexer, and the first multiplexer multiplexes the second processing signal and a first processing signal digitized by the first common circuit.

12. The optical receiver according to claim 3, wherein the first common circuit includes a first analog-digital converter, the second common circuit includes a second analog-digital converter having a same configuration as the first analog-digital converter, in the subcarrier multiplexing transmission, the first common circuit distributes the electric signal digitized by the first analog-digital converter to and from the second common circuit, and the second analog-digital converter is turned off.

13. The optical receiver according to claim 2, further comprising:

an optical coupler configured to branch an optical signal received from a transmission path and output a first light to the first converting circuit;

a second converting circuit configured to convert a second light branched from the optical coupler into a second electric signal;

a third common circuit coupled to the second converting circuit and having a same configuration as the first common circuit and the second common circuit; and a fourth common circuit having a same configuration as the third common circuit, wherein the first common circuit and the second common circuit digitize a subcarrier signal included in the first optical signal, and the third common circuit and the fourth common circuit digitize a subcarrier signal included in the second optical signal.

14. The optical receiver according to claim 1, wherein the plurality of common circuits are disposed on one chip or on separate chips.

15. An optical transmission system comprising:

an optical transmitter including a plurality of signal processing circuits, each of which has a same configuration, configured to select a signal processing circuit to be used among the plurality of signal processing circuits according to a transmission method and transmit an optical signal in the transmission method; and an optical receiver including, a first converting circuit configured to convert the optical signal into an electric signal, a plurality of common circuits, each of which has a same circuit configuration, configured to perform a digital signal processing on the electric signal, and a processor configured to select and operate one or more common circuits from among the plurality of common circuits according to whether the transmission method is a single carrier transmission or a subcarrier multiplexing transmission, wherein the processor is configured to select and operate common circuits based on a number of subcarriers among the plurality of common circuits when the transmission method is the subcarrier multiplexing transmission, processing speed of the digital signal processing operation of the common circuits performed on the electric signal varies depending on the number of subcarriers.

16. A reception processing method for an optical receiver including a first converting circuit, a plurality of common circuits, each of which has a same circuit configuration and a processor, the method comprising:

converting, by the first converting circuit, an optical signal into an electric signal;

performing, by the plurality of common circuits, a digital signal processing on the electric signal; and selecting and operating, by the processor, one or more common circuits from among the plurality of common circuits according to whether a transmission method is a single carrier transmission or a subcarrier multiplexing transmission, wherein in the selecting and operating, the processor selects and operates common circuits based on a number of subcarriers among the plurality of common circuits when the transmission method is the subcarrier multiplexing transmission, processing speed of the digital signal processing operation of the common circuits performed on the electric signal varies depending on the number of subcarriers.

17. The reception processing method according to claim 16, wherein the plurality of common circuits include at least a first common circuit and a second common circuit, and in the single carrier transmission, the processor selects and operates the first common circuit such that the second common circuit is turned off, and in the subcarrier multiplexing transmission, the processor selects and operates the first common circuit and the second common circuit.

* * * * *